(12) United States Patent
Uesaki et al.

(10) Patent No.: US 6,844,876 B2
(45) Date of Patent: Jan. 18, 2005

(54) APPARATUS AND METHOD FOR GENERATING 3D GRAPHICS

(75) Inventors: Akira Uesaki, Takatsuki (JP); Yoshiyuki Mochizuki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 420 days.

(21) Appl. No.: 10/158,129

(22) Filed: May 31, 2002

(65) Prior Publication Data

US 2003/0025650 A1 Feb. 6, 2003

(30) Foreign Application Priority Data

Jun. 1, 2001 (JP) .................................... 2001-166080

(51) Int. Cl.[7] .............................................. G06T 15/00
(52) U.S. Cl. ..................................................... 345/419
(58) Field of Search ................................ 345/419, 420, 345/421, 427, 428, 619

(56) References Cited

U.S. PATENT DOCUMENTS

| | | | | |
|---|---|---|---|---|
| 5,202,928 A | * | 4/1993 | Tomita et al. | 382/154 |
| 5,675,720 A | * | 10/1997 | Sato et al. | 345/419 |
| 5,936,628 A | * | 8/1999 | Kitamura et al. | 345/420 |
| 6,384,826 B1 | * | 5/2002 | Bern et al. | 345/441 |
| 6,791,549 B2 | * | 9/2004 | Hubrecht et al. | 345/473 |

FOREIGN PATENT DOCUMENTS

JP 63-103380 5/1988

* cited by examiner

*Primary Examiner*—Phu K. Nguyen
(74) *Attorney, Agent, or Firm*—Wenderoth, Lind & Ponack, L.L.P.

(57) ABSTRACT

A three-dimensional (3D) graphic generation apparatus and its generation method according to the present invention generate high quality 3D graphics from two-dimensional (2D) graphics such as characters, without requiring difficult operations. Triangulation is performed using outline data corresponding to a sequence of all points which form an outline of a 2D graphic including a 2D character or the like, and thereafter configurations of the triangles are changed using the outline segments. The generated triangles are judged whether or not they are components of the character, and triangles that have been judged as the components are spatially moved, thereby generating the top surface. Further, side surfaces are generated by connecting corresponding points, thereby generating a 3D graphic.

35 Claims, 16 Drawing Sheets

APPARATUS AND METHOD FOR GENERATING 3D GRAPHICS

FIELD OF THE INVENTION

The present invention relates to a three-dimensional (3D) graphic generation apparatus and a 3D graphic generation method which generate 3D graphics from 2D graphics. More particularly, this invention relates to a 3D graphic generation apparatus and a 3D graphic generation method which transform 2D graphics into 3D graphics with utilizing outline data.

BACKGROUND OF THE INVENTION

In recent years, three-dimensional computer graphic (hereinafter, abbreviated as 3D CG) are widely used in computers and programming broadcasts, and when characters or the like which are originally two-dimensional (2D) symbols are also used in a 3D virtual space, these characters can be made consistent with other objects that constitute the virtual space, or they can be variously decorated. Accordingly, there are more and more cases where these 2D characters or the like are handled as solid 3D graphics. In order to represent 2D graphics like characters in the 3D CG, 3D graphics should be generated from the 2D graphics. As an example of conventional 3D graphic generation apparatus, there is a 3D character creation apparatus that is disclosed in Japanese Published Patent Application No. Hei.63-103380.

Hereinafter, the conventional 3D character creation apparatus will be described with reference to FIG. 17. FIG. 17 is a block diagram showing functions of the conventional 3D character creation apparatus.

When a 3D character is created by this conventional 3D character creation apparatus, a 2D character is first inputted through a 2D character input unit 640. By this input, the 2D character on a x-y plane is stored in a storage unit 620. Next, the 2D character stored in the storage unit 620 is displayed on a display unit 601, and then the shape of a 3D character is designed by operating a z-direction retouch unit 630 while seeing the image on the display unit 610. More specifically, the z coordinate of each point is changed on the x-z projection plane 612 or y-z projection plane 613 of the display unit 610 by the z-direction retouch unit 630. Then, the 3D character that has been generated by the above-mentioned retouch is stored in the storage unit 620. Here, the solid object image of the 3D character that is being retouched can be checked on a solid object projecting plane 614. Further, when image data of a design is inputted from a design and background input unit 650, image data of the 3D character in the storage unit 620 having the design attached thereto is generated, and then this image is displayed on the solid object projecting plane 614.

However, to create 3D characters by the above-mentioned conventional 3D character creation apparatus, inputted 2D characters should be retouched and transformed into 3D characters manually by operators. Therefore, when the 3D characters are created by employing the prior art apparatus, the operators are heavily burdened. Further, in order to create finely decorated 3D characters by employing the above-mentioned apparatus, the operator is required to be expert in the retouch process, and thus 3D characters of high quality cannot be easily created.

SUMMARY OF THE INVENTION

The present invention has for its object to provide a 3D graphic generation apparatus and a 3D graphic generation method which can generate 3D graphics of high quality from 2D graphics such as characters, without requiring difficult operations.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a three-dimensional (3D) graphic generation apparatus including: a triangulation unit for generating a two-dimensional (2D) convex closure that contains a 2D graphic and representing the 2D convex closure by a cluster of plural triangles, by using outline data of the 2D graphic; a graphic component judgement unit for judging whether each of the triangles generated by the triangulation unit is a component constituting the 2D graphic or not; and a graphic component 2D-to-3D transformation unit for generating side surfaces corresponding to outline data of a graphic formed by a cluster of triangles which have been judged by the graphic component judgement unit as constituting the 2D graphic, thereby generating a 3D graphic. Therefore, a 3D graphic can be automatically created from a 2D graphic through a simple operation by the operator.

According to a 2nd aspect of the present invention, in the 3D graphic generation apparatus of the 1st aspect, the triangulation unit includes: a first division unit for dividing the 2D convex closure into plural triangles with using the outline data; and a second division unit for detecting triangles which intersect a segment that is obtained by connecting two adjacent points of the outline data, from the triangles obtained by the first division unit, to eliminate the detected triangles, and re-dividing an area corresponding to the eliminated triangles into triangles which do not intersect the segment. Therefore, the 2D convex closure containing the 2D graphic can be represented by plural triangles which are constituted only by components of the 2D graphic or only by data other than the components of the 2D graphic, by using outline data constituting the outline of the 2D graphic.

According to a 3rd aspect of the present invention, in the 3D graphic generation apparatus of the 1st aspect, the graphic component judgement unit includes: an adjacent data triangle component judgement unit for, by using a segment that is obtained by connecting adjacent two points of the outline data, judging whether an adjacent data triangle that is a triangle having the segment as a side is a component of the 2D graphic or not; and a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not. Therefore, whether each of the plural triangles obtained by dividing the 2D convex closure that contains the 2D graphic is a component of the 2D graphic or not can be judged.

According to a 4th aspect of the present invention, the 3D graphic generation apparatus of the 1st aspect includes: a graphic quality improvement unit for transforming the 3D graphic that is created by the graphic component 2D-to-3D transformation unit into a smooth and curved shape. Therefore, a 3D graphic of high quality can be automatically generated from the 2D graphic, without requiring a difficult operation by the operator.

According to a 5th aspect of the present invention, the 3D graphic generation apparatus of the 1st aspect includes: a graphic decoration unit for transforming the 3D graphic that is created by the graphic component 2D-to-3D transformation unit into a shape having small asperities. Therefore, a decorated 3D graphic can be automatically generated from the 2D graphic, without requiring a difficult operation by the operator.

According to a 6th aspect of the present invention, there is provided a 3D graphic generation apparatus including: a triangulation unit for generating a 2D convex closure that contains a 2D graphic and a base plate and representing the 2D convex closure by a cluster of plural triangles, by using outline data of the 2D graphic and outline data of the base plate; a graphic component judgement unit for judging whether each of the triangles generated by the triangulation unit is a component constituting the 2D graphic or not; and a graphic and base plate component 2D-to-3D transformation unit for generating side surfaces corresponding to outline data of the base plate, and generating, from a top surface of the base plate, side surfaces corresponding to outline data of a graphic formed by a cluster of triangles which have been judged by the graphic component judgement unit as constituting the 2D graphic, thereby generating a 3D graphic with base. Therefore, a 3D graphic with base can be automatically generated from the 2D graphic and the base plate containing the 2D graphic, without separately transforming the 2D graphic and the base plate into 3D images and composing the same, and further without requiring a difficult manual operation by the operator.

According to a 7th aspect of the present invention, in the 3D graphic generation apparatus of the 6th aspect, the triangulation unit includes: a first division unit for dividing the 2D convex closure into plural triangles with using the outline data; and a second division unit for detecting triangles which intersect a segment that is obtained by connecting adjacent two points of the outline data, from the triangles obtained by the first division unit, to eliminate the detected triangles, and re-dividing an area corresponding to the eliminated triangles into triangles which do not intersect the segment. Therefore, the 2D convex closure containing the 2D graphic and the base plate can be represented by plural triangles which are constituted only by components of the 2D graphic or only by data other than the components of the 2D graphic, by using outline data constituting the outline of the 2D graphic and the base plate.

According to an 8th aspect of the present invention, in the 3D graphic generation apparatus of the 6th aspect, the graphic component judgement unit includes: an adjacent data triangle component judgement unit for, by using a segment that is obtained by connecting adjacent two points of the outline data, judging whether an adjacent data triangle that is a triangle having the segment as a side is a component of the 2D graphic or not; and a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not. Therefore, whether each of the plural triangles obtained by dividing the 2D convex closure that contains the 2D graphic and the base plate is a component of the 2D graphic or not can be judged.

According to a 9th aspect of the present invention, the 3D graphic generation apparatus of the 6th aspect includes: a graphic quality improvement unit for transforming the 3D graphic with base which is created by the graphic and base plate component 2D-to-3D transformation unit into a smooth and curved shape. Therefore, a 3D graphic with base of high quality can be automatically generated from the 2D graphic and the base plate that contains the 2D graphic, through a simple operation by the operator.

According to a 10th aspect of the present invention, the 3D graphic generation apparatus of the 6th aspect includes: a graphic decoration unit for transforming the 3D graphic with base which is created by the graphic and base plate component 2D-to-3D transformation unit into a shape having a small asperities. Therefore, a decorated 3D graphic with base can be automatically generated from the 2D graphic and the base plate that contains the 2D graphic, through a simple operation by the operator.

According to an 11th aspect of the present invention, there is provided a 3D graphic generation apparatus including: a triangulation unit for generating a 2D convex closure that contains a 2D graphic and an engraving plate and representing the 2D convex closure by a cluster of plural triangles, by using outline data of the 2D graphic and outline data of the engraving plate; a graphic component judgement unit for judging whether each of the triangles generated by the triangulation unit is a component constituting the 2D graphic or not; and a graphic and engraving plate component 2D-to-3D transformation unit for generating side surfaces corresponding to outline data of the engraving plate, and generating, from a top surface of the engraving plate, side surfaces corresponding to outline data of a graphic formed by a cluster of triangles which have been judged by the graphic component judgement unit as not constituting the 2D graphic, thereby generating an engraved 3D graphic. Therefore, a 3D graphic that is engraved on an engraving plate can be automatically generated from the 2D graphic and the engraving plate that contains the 2D graphic, through a simple operation by the operator, without transforming the 2D graphic and the engraving plate into 3D images separately and composing the same.

According to a 12th aspect of the present invention, in the 3D graphic generation apparatus of the 11th aspect, the triangulation unit includes: a first division unit for dividing the 2D convex closure into plural triangles with using the outline data; and a second division unit for detecting triangles which intersect a segment that is obtained by connecting adjacent two points of the outline data, from the triangles obtained by the first division unit, to eliminate the detected triangles, and re-dividing an area corresponding to the eliminated triangles into triangles which do not intersect the segment. Therefore, a 2D convex closure containing the 2D graphic and the engraving plate can be represented by plural triangles which are constituted only by components of the 2D graphic or only by data other than the components of the 2D graphic, by using outline data that constitute the outlines of the 2D graphic and the engraving plate.

According to a 13th aspect of the present invention, in the 3D graphic generation apparatus of the 11th aspect, the graphic component judgement unit includes: an adjacent data triangle component judgement unit for, by using a segment that is obtained by connecting adjacent two points of the outline data, judging whether an adjacent data triangle that is a triangle having the segment as a side is a component of the 2D graphic or not; and a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not. Therefore, whether each of the plural triangles obtained by dividing a 2D convex closure that contains the 2D graphic and the engraving plate is a component of the 2D graphic or not can be judged.

According to a 14th aspect of the present invention, the 3D graphic generation apparatus of the 11th aspect includes: a quality improvement unit for transforming the engraved 3D graphic that is created by the graphic and engraving plate component 2D-to-3D transformation unit, into a smooth and curved shape. Therefore, a 3D graphic of high quality that is engraved on the engraving plate can be automatically generated from the 2D graphic and the engraving plate that contains the 2D graphic, through a simple operation by the operator.

According to a 15th aspect of the present invention, the 3D graphic generation apparatus of the 11th aspect includes: a graphic decoration unit for transforming the engraved 3D graphic that is created by the graphic and engraving plate component 2D-to-3D transformation unit, into a shape having small asperities. Therefore, a decorated 3D graphic that is engraved on the engraving plate can be automatically generated from the 2D graphic and the engraving plate containing the 2D graphic, through a simple operation by the operator.

According to a 16th aspect of the present invention, in the 3D graphic generation apparatus of the 1st aspect, the 2D graphic is a 2D character, and a 3D character is created from the 2D character. Therefore, a 3D character can be automatically generated from the 2D character, through a simple operation by the operator.

According to a 17th aspect of the present invention, in the 3D graphic generation apparatus of the 6th aspect, the 2D graphic is a 2D character, and a 3D character with base is created from the 2D character and the base plate. Therefore, a 3D character with base can be automatically generated from the 2D character and the base plate, through a simple operation by the operator.

According to an 18th aspect of the present invention, in the 3D graphic generation apparatus of the 11th aspect, the 2D graphic is a 2D character, and an engraved 3D character is created from the 2D character and the engraving plate. Therefore, an engraved 3D character can be automatically generated from the 2D graphic and the engraving plate, through a simple operation by the operator.

According to a 19th aspect of the present invention, the 3D graphic generation apparatus of the 16th aspect includes: an outline storage device for holding 2D character outline data corresponding to 2D character codes and font type information; and an outline data obtaining unit for obtaining 2D character outline data corresponding to the inputted 2D character code and font type information, from the outline storage device. Therefore, when a character code and font type information of a 2D character that is to be transformed into a 3D image is inputted, outline data of the 2D character can be obtained and a 3D character can be automatically generated using the outline data, through a simple operation by the operator.

According to a 20th aspect of the present invention, the 3D graphic generation apparatus of the 16th aspect includes: a speech-to-character code transformation unit for transforming speech into the 2D character code; an outline storage device for holding 2D outline data corresponding to the 2D character code and font type information; and an outline data obtaining unit for obtaining 2D character outline data corresponding to the 2D character code obtained by the speech-to-character code transformation unit, and the inputted font type information, from the outline storage device. Therefore, a 3D character can be automatically generated from inputted speech information through a simple operation by the operator.

According to a 21st aspect of the present invention, there is provided a 3D graphic generation method including: a triangulation step of generating a 2D convex closure that contains a 2D graphic and representing the 2D convex closure by a cluster of plural triangles, by using outline data of the 2D graphic; a graphic component judgement step of judging whether each of the triangles generated in the triangulation step is a component constituting the 2D graphic or not; and a graphic component 2D-to-3D transformation step of generating side surfaces corresponding to outline data of a graphic formed by a cluster of triangles which have been judged in the graphic component judgement step as constituting the 2D graphic, thereby generating a 3D graphic. Therefore, a 3D graphic can be automatically obtained from the 2D graphic, through a simple operation by the operator.

According to a 22nd aspect of the present invention, in the 3D graphic generation method of the 21st aspect, in the triangulation step, first triangulation is carried out for dividing the 2D convex closure into plural triangles, with using the outline data; and second triangulation is carried out for detecting triangles which intersect a segment that is obtained by connecting adjacent two points of the outline data, from the obtained triangles, to eliminate the detected triangles, and re-dividing an area corresponding to the eliminated triangles into triangles which do not intersect the segment. Therefore, by using outline data constituting the outline of a 2D graphic, the 2D convex closure containing the 2D graphic can be represented by plural triangles which are constituted only by components of the 2D graphic, or only by data other than the components of the 2D graphic.

According to a 23rd aspect of the present invention, in the 3D graphic generation method of the 21st aspect, in the graphic component judgement step, an adjacent data triangle having a segment that is obtained by connecting adjacent two points of the outline data as a side is detected; a loop for judging which side of the segment includes one of points which forms the detected adjacent data triangle but is not located on the segment, thereby judging whether the adjacent data triangle is a component constituting the 2D graphic or not, is repeated for plural segments; a non-adjacent data triangle which is constituted by non-adjacent three points of the outline data and has a side common with the adjacent data triangle that has been judged whether it is a component of the 2D graphic or not, is detected; and a loop for judging whether the detected non-adjacent data triangle is a component of the 2D graphic or not, by using judgement results as to the adjacent data triangles is repeated for the plural non-adjacent data triangles. Therefore, it can be judged whether each of plural triangles which are obtained by dividing the 2D convex closure containing the 2D graphic is a component of the 2D graphic or not.

According to a 24th aspect of the present invention, there is provided a 3D graphic generation method including: a triangulation step of generating a 2D convex closure that contains a 2D graphic and a base plate and representing the 2D convex closure by a cluster of plural triangles, by using outline data of the 2D graphic and outline data of the base plate; a graphic component judgement step of judging whether each of the triangles generated in the triangulation step is a component constituting the 2D graphic or not; and a graphic and base plate component 2D-to-3D transformation step of generating side surfaces corresponding to outline data of the base plate, and generating, from a top surface of the base plate, side surfaces corresponding to outline data of a graphic which is formed by a cluster of triangles which have been judged in the graphic component judgement step as constituting the 2D graphic, thereby generating a 3D graphic with base. Therefore, a 3D graphic with base can be obtained from the 2D graphic and the base plate containing the 2D graphic, through a simple operation by the operator, and without separately transforming the 2D graphic and the base plate into 3D images and composing the same.

According to a 25th aspect of the present invention, there is provided a 3D graphic generation method including: a triangulation step of generating a 2D convex closure that contains a 2D graphic and an engraving plate and representing the 2D convex closure by a cluster of plural triangles, by using outline data of the 2D graphic and outline data of the engraving plate; a graphic component judgement step of judging whether each of the triangles generated in the triangulation step is a component constituting the 2D graphic or not; and a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic. Therefore, a 3D graphic that is engraved on an engraving plate can be obtained from the 2D graphic and the engraving plate containing the 2D graphic through a simple operation by the operator, without separately transforming the graphic and the engraving plate into 3D images and composing the same.

According to a 26th aspect of the present invention, in the 3D graphic generation method of the 21st aspect, the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character. Therefore, when a character code and font type information of a 2D character that is to be transformed into a 3D image is inputted, outline data of the 2D character can be obtained, and a 3D character can be obtained by using the outline data through a simpler operation.

According to a 27th aspect of the present invention, in the 3D graphic generation method of the 24th aspect, the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character. Therefore, when a character code and font type information of a 2D character that is to be transformed into a 3D image is inputted, outline data of the 2D character can be obtained, and thus a 3D character with base can be obtained by using this outline data and outline data of the base plate, by a simpler operation.

According to a 28th aspect of the present invention, in the 3D graphic generation method of the 25th aspect, the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character. Therefore, when a character code and font type information of a 2D character that is to be transformed into a 3D image is inputted, outline data of the 2D character can be obtained and thus an engraved 3D character can be obtained by using this outline data and outline data of the engraving plate through a simpler operation.

According to a 29th aspect of the present invention, in the 3D graphic generation method of the 26th aspect, the outline data obtaining step includes a speech-to-character code transformation step of transforming speech information that is inputted from outside into the 2D character code. Therefore, a 3D character can be obtained from speech information that is inputted from outside, through a simpler operation.

According to a 30th aspect of the present invention, there is provided a program storage medium which contains a program for enabling a computer to implement a process for transforming a 2D graphic into a 3D graphic, and the program is a 3D graphic generation program including: a triangulation step of generating a 2D convex closure that contains the 2D graphic and representing the 2D convex closure by a cluster of plural triangles, by using outline data of the 2D graphic; a graphic component judgement step of judging whether each of the triangles generated in the triangulation step is a component constituting the 2D graphic or not; and a graphic component 2D-to-3D transformation step of generating side surfaces corresponding to outline data of a graphic formed by a cluster of triangles which have been judged in the graphic component judgement step as constituting the 2D graphic, thereby generating a 3D graphic. Therefore, a 2D-to-3D transformation process of transforming a 2D graphic into a 3D image can be carried out by software, through a simple operation by the operator.

According to a 31st aspect of the present invention, there is provided a program storage medium which contains a program for enabling a computer to implement a process for transforming a 2D graphic into a 3D graphic, and the program is a 3D graphic-with-base generation program including: a triangulation step of generating a 2D convex closure that contains a 2D graphic and a base plate and representing the 2D convex closure by a cluster of plural triangles, by using outline data of the 2D graphic and outline data of the base plate; a graphic component judgement step of judging whether each of the triangles generated in the triangulation step is a component constituting the 2D graphic or not; and a graphic and base plate component 2D-to-3D transformation step for generating side surfaces corresponding to outline data of the base plate, and generating, from a top surface of the base plate, side surfaces corresponding to outline data of a graphic formed by a cluster of triangles which have been judged in the graphic component judgement step as constituting the 2D graphic, thereby generating a 3D graphic with base. Therefore, a 2D-to-3D transformation process of generating the 3D graphic with base at a time from the 2D graphic and a base plate containing the 2D graphic, without separately transforming the 2D graphic and the base plate containing the 2D graphic into 3D images and composing the same can be carried out by software, through a simple operation by the operator.

According to a 32nd aspect of the present invention, there is provided a program storage medium which contains a program for enabling a computer to implement a process for transforming a 2D graphic into an engraved 3D graphic, and the program is an engraved 3D graphic generation program including: a triangulation step of generating a 2D convex closure that contains a 2D graphic and an engraving plate and representing the 2D convex closure by a cluster of plural triangles, by using outline data of the 2D graphic and outline data of the engraving plate; a graphic component judgement step of judging whether each of the triangles generated in the triangulation step is a component constituting the 2D graphic or not; and a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic. Therefore, a 2D-to-3D transformation process of generating an engraved 3D graphic that is obtained by carving the 2D graphic on a 3D engraving plate, at a time from the 2D graphic and the engraving plate containing the 2D graphic, without separately transforming the 2D graphic and the engraving plate containing the 2D graphic into 3D images and composing the same, can be carried out by software, through a simple operation by the operator.

According to a 33rd aspect of the present invention, there is provided a 3D graphic generation program for enabling a computer to implement a process for transforming a 2D graphic into a 3D graphic, and this program includes: a triangulation step of generating a 2D convex closure that contains the 2D graphic and representing the 2D convex closure by a cluster of plural triangles, by using outline data of the 2D graphic; a graphic component judgement step of judging whether each of the triangles generated in the triangulation step is a component constituting the 2D graphic or not; and a graphic component 2D-to-3D transformation step of generating side surfaces corresponding to outline data of a graphic formed by a cluster of triangles which have been judged in the graphic component judgement step as constituting the 2D graphic, thereby generating a 3D graphic. Therefore, a 2D-to-3D transformation process of transforming the 2D graphic into a 3D image can be carried out by software, through a simple operation by the operator.

According to a 34th aspect of the present invention, there is provided a 3D graphic generation program for enabling a computer to implement a process for transforming a 2D graphic into a 3D graphic with base, and this program includes: a triangulation step of generating a 2D convex closure that contains a 2D graphic and a base plate and representing the 2D convex closure by a cluster of plural triangles, by using outline data of the 2D graphic and outline data of the base plate; a graphic component judgement step of judging whether each of the triangles generated in the triangulation step is a component constituting the 2D graphic or not; and a graphic and base plate component 2D-to-3D transformation step for generating side surfaces corresponding to outline data of the base plate, and generating, from a top surface of the base plate, side surfaces corresponding to outline data of a graphic formed by a cluster of triangles which have been judged in the graphic component judgement step as constituting the 2D graphic, thereby generating a 3D graphic with base. Therefore, a 2D-to-3D transformation process of generating a 3D graphic with base, at a time from the 2D graphic and a base plate containing the 2D graphic, without separately transforming the 2D graphic and the base plate containing the 2D graphic into 3D images and composing the same, can be carried out by software, through a simple operation by the operator.

According to a 35th aspect of the present invention, there is provided a 3D graphic generation program for enabling a computer to implement a process for transforming a 2D graphic into an engraved 3D graphic, and this program includes: a triangulation step of generating a 2D convex closure that contains a 2D graphic and an engraving plate and representing the 2D convex closure by a cluster of plural triangles, by using outline data of the 2D graphic and outline data of the engraving plate; a graphic component judgement step of judging whether each of the triangles generated in the triangulation step is a component constituting the 2D graphic or not; and a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic. Therefore, a 2D-to-3D transformation process of generating an engraved 3D graphic that is obtained by carving the 2D graphic on an engraving plate that has been transformed into a 3D image, at a time from the 2D graphic and the engraving plate containing the 2D graphic, without separately transforming the 2D graphic and the engraving plate containing the 2D graphic into 3D images and composing the same, can be carried out by software through a simple operation by the operator.

DETAILED DESCRIPTION OF THE PREFERRED EMBODIMENTS

In embodiments described below, characters are used as examples of 2D graphics, while the present invention is applicable to arbitrary 2D graphics having outline data.
[Embodiment 1]

Hereinafter, a first embodiment of the present invention will be described with reference to FIGS. 1 to 5.

Figure 1:
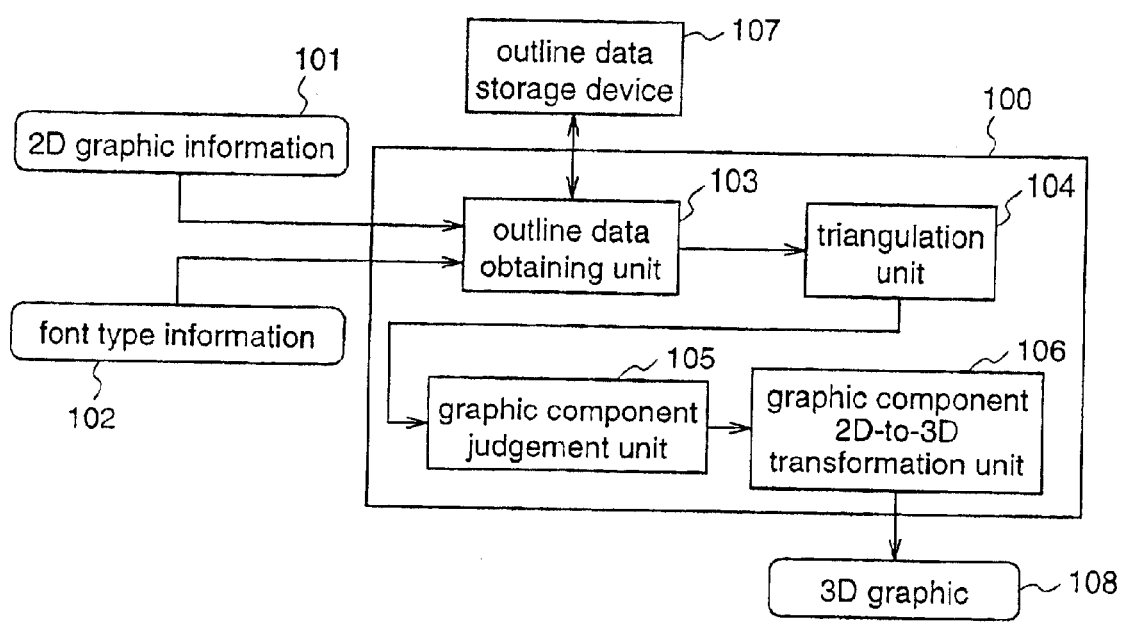
FIG. 1 is a block diagram illustrating a structure of a 3D graphic generation apparatus according to a first embodiment of the present invention.

Initially, with reference to FIG. 1, a 3D graphic generation apparatus according to the first embodiment will be described. FIG. 1 is a diagram illustrating a structure of a 3D graphic generation apparatus according to the first embodiment.

In FIG. 1, a 3D graphic generation apparatus 100 according to the first embodiment includes an outline data obtaining unit 103, a triangulation unit 104, a graphic component judgement unit 105, and a graphic component 2D-to-3D transformation unit 106, and has an outline data storage device 107 externally. Here, this 3D graphic generation apparatus 100 is realized in computer equipment mainly by software.

The outline data obtaining unit 103 obtains outline data of an inputted character, from inputted 2D graphic information 101 and font type information 102.

The 2D graphic information 101 is character codes such as JIS codes and ASCII codes. The kinds of the characters are not particularly defined, and may be any of hirakana characters, katakana characters, kanji (Chinese characters), alphanumerics, and symbols. Further, the font type information 102 specifies which font type of a character is used.

The triangulation unit 104 triangulates a plane that it constituted by the outline data of the inputted character, which is obtained by the outline data obtaining unit 103. The graphic component judgement unit 105 judges whether the triangles which are obtained by the triangulation unit 104 are components of the character (2D graphic) or not. The graphic component 2D-to-3D transformation unit 106 spatially moves parts which are judged by the graphic component judgement unit 105 as components of the character (2D graphic), to create a new plane for generating a 3D graphic 108 as a 3D character.

The outline data storage device 107 contains the outline data of the inputted 2D character. Because even the same character usually has outlines which are different according to the types of the fonts, all outlines corresponding to respective font types of the character are stored in the storage device. However, since some characters have structures including holes and, in the case of kanji, some characters can be divided into left-hand portions (hen) and right-hand portions (tsukuri), there are plural possible outlines with respect to one character whose font is designated. Therefore, as for respective outlines each constituting a character, it is assumed that a sequence of points constituting the outline (hereinafter, referred to as "outline data") are arranged in the clockwise direction in an outline representing an outer periphery of the character and in the counterclockwise direction in an outline representing a shape of a hole, respectively, and further that each outline data has an identifier that specifies whether the outline data represents the periphery of the character or the shape of the hole.

While it is assumed that the outline data constituting the outline of each character are arranged in the clockwise direction for data representing the periphery of the character while arranged in the counterclockwise direction for data representing the shape of the hole, the outline data may be arranged in reverse thereto.

Also while it is assumed that respective outline data have identifiers each specifying whether it represents the periphery of the character or the shape of the hole, each outline data may have no identifier. Then, it is possible to judge whether the sequence of points constituting the outline are arranged in the clockwise direction or in the counterclockwise direction by generating a vector using adjacent two points of the outline data and calculating inner products and the outer products of adjacent two vectors.

In this first embodiment, it is assumed that whether all the outline data stored in the outline data storage device 107 represent the periphery of the character or the shape of the hole has been already analyzed by the above-mentioned method.

Next, the operation of the 3D graphic generation apparatus according to the first embodiment will be described with reference to FIGS. 1 to 5.

Initially, by using a character code as inputted 2D graphic information 101, and the font type information 102, the outline data obtaining unit 103 obtains outline data of a character corresponding to the inputted information from the outline data storage device 107.

In this first embodiment, it is assumed that a right hand coordinate system is adopted in which the outline data of the character exists in the x-y coordinate system and the height direction in transformed the character into a 3D image is the z-axis direction.

Next, the triangulation unit 104 triangulates a plane that is constituted by the outline data that is obtained by the outline data obtaining unit 103.

Figure 2:
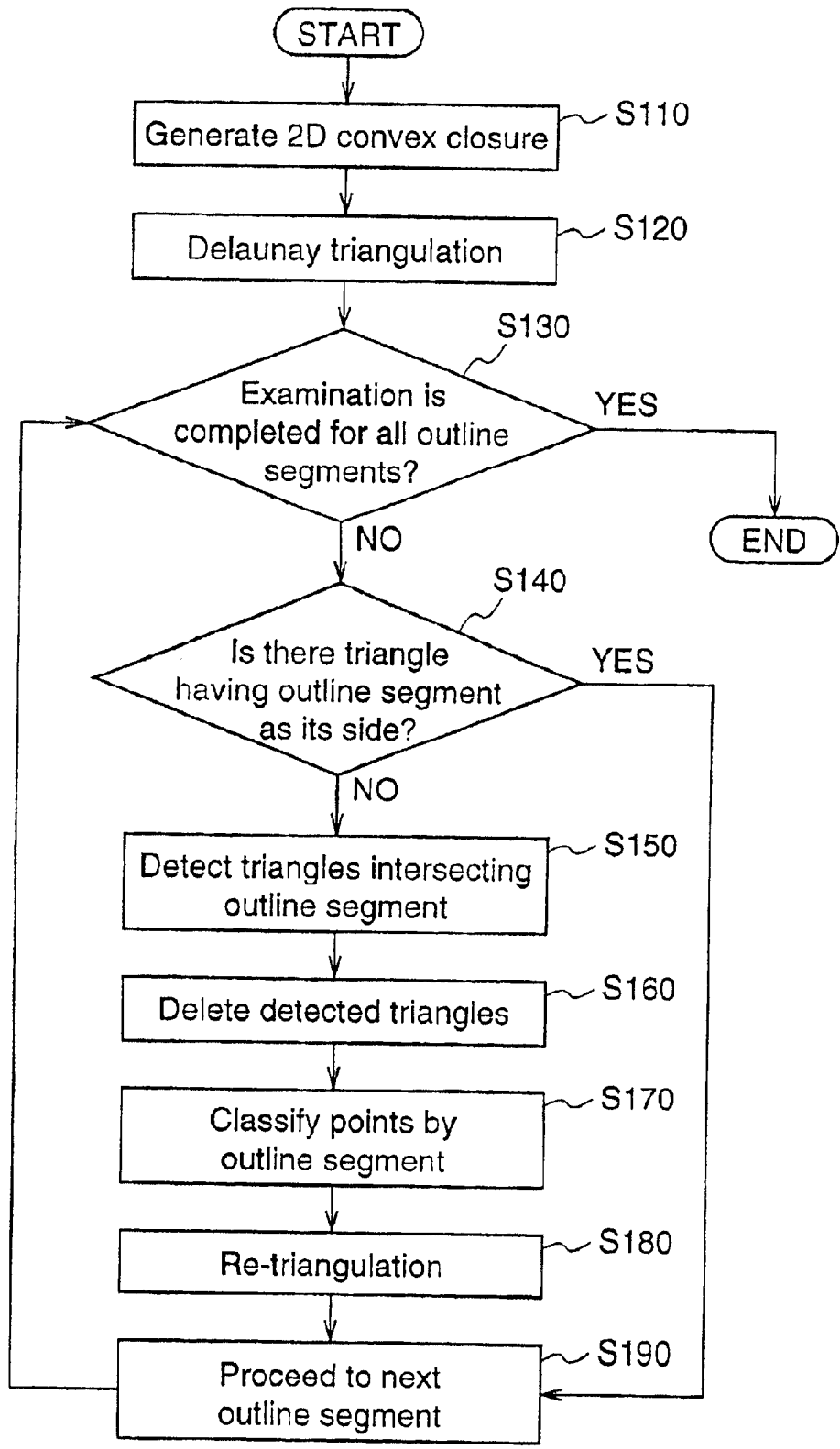
FIG. 2 is a flowchart showing a series of operations of a triangulation unit according to the first embodiment.
Figure 3:
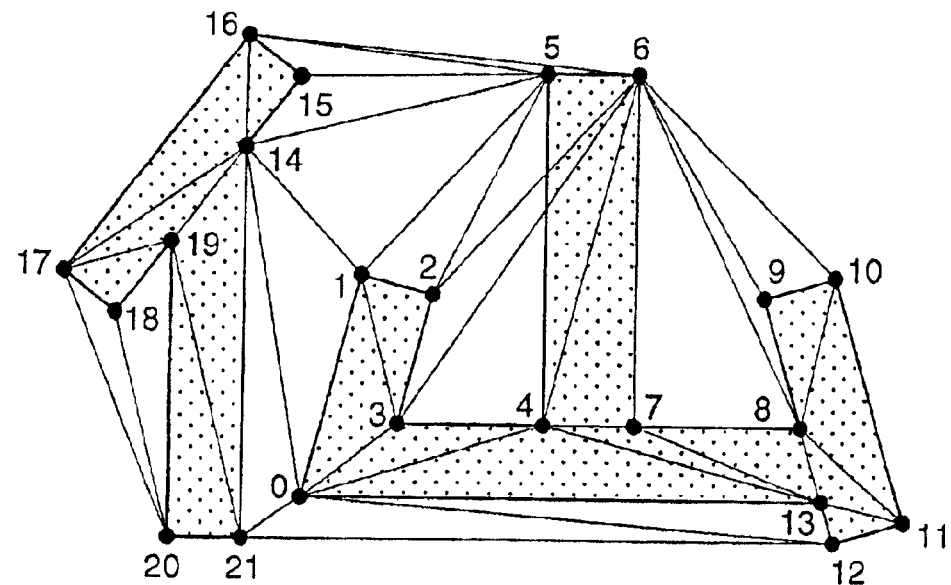
FIGS. 3(a) and 3(b) are diagrams illustrating states of a 2D character "山" (Chinese character) which is subjected to a triangulation process according, to the first embodiment.
Figure 3:
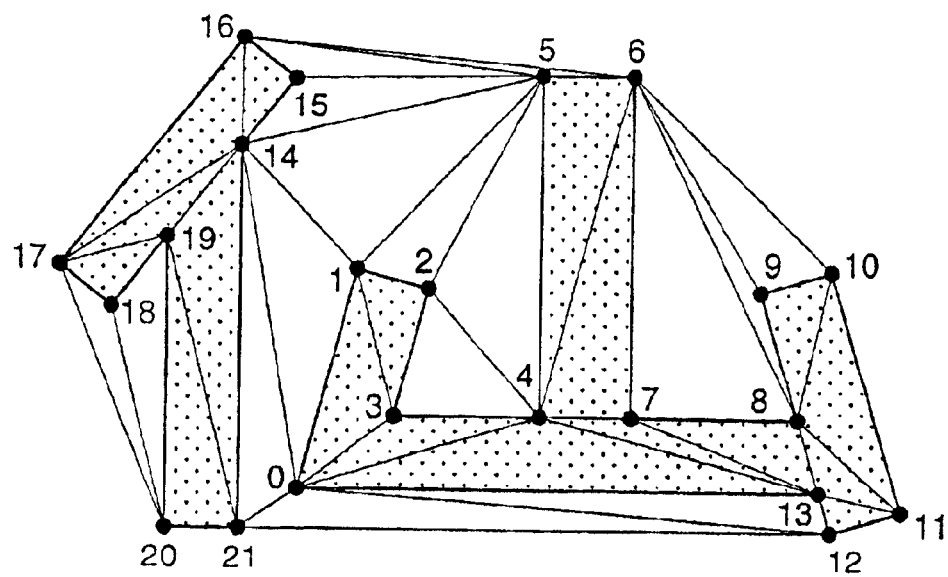

The triangulation unit 104 will be described in more detail with reference to FIGS. 2 and 3. FIG. 2 is a flowchart showing a series of processes of the triangulation unit according to the first embodiment. FIGS. 3(a) and 3(b) are diagrams illustrating a character "山", which is divided into plural triangles by the triangulation unit according to the first embodiment.

Initially, in step S110, a 2D convex closure containing all outline data is generated by using Graham algorithm or Quickhull algorithm. For example, in FIG. 3, the 2D convex closure is a plane that is defined by points 6, 10, 11, 12, 21, 20, 17 and 16.

Next, in step S120, the 2D convex closure containing the character is represented by a cluster of plural triangles according to the Delaunay triangulation, using outline data corresponding to all outlines constituting the character. Then in step S140, as for each segment that is formed by adjacent two points of the outline data obtained by the outline data obtaining unit 103 (hereinafter, referred to as "outline segment"), whether or not there exists a triangle (hereinafter, referred to as "adjacent data triangle") having the outline segment as a side is investigated. When there is a triangle having the outline segment as a side in step S140, the operation proceeds to step S190. On the other hand, when there is no triangle having the outline segment as a side, triangles intersecting this outline segment are detected in step S150. The detection of the triangles intersecting the outline segment in step S150 is carried out under the following procedure.

Initially, among the triangles generated according to the Delaunay triangulation, triangles having one of two points defining an outline segment: Pi=(xPi, yPi) and P(i+1)=(xP(i+1), yP(i+1)) as a vertex are all detected. Here, i=0, ..., N−1, and PN=P0.

Then, by using a side which is obtained by connecting two points Vj=(xVj, yVj) and Vk=(xVk, yVk) among vertices of all the above detected triangles that have one point of the outline segment Pi–P(i+1) as their vertices, except for Pi and P(i+1), and the outline segment Pi–P(i+1), tc=(xPi−xP(i+1))(yVj−yPi)+(yPi−yP(i+1)(xPi−xVj) and td=(xPi−xP(i+1))(yVk−yPi)+(yPi−yP(i+1)(xPi−xVk) are calculated.

From tc and td obtained by the above-mentioned formulas, when tc×td<0, it is judged to be a triangle intersecting the outline segment.

As triangles which are detected by the above-mentioned procedure intersect the above outline segment, there always exist two or more and these triangles which are detected in step S150 and intersect the outline segment are deleted in step S160. Then in step S170, to which side of the outline segment the points constituting the triangles which have been deleted in step S160 belong to is judged, to classify the points. Then in step S180, using a group of points that have been judged in step S170 that they are in the same side and the two points forming the outline segment, the Delaunay triangulation is again performed.

Here, with reference to FIGS. 3(a) and 3(b), steps S120 to S180 that are carried out by the triangulation unit 104 are described in more detail. FIG. 3(a) is a diagram illustrating a processed state of a 2D character "仙" after step S120 is carried out by the triangulation unit according to the first embodiment. FIG. 3(b) is a diagram illustrating a processed state of the 2D character "仙" after step S180 is carried out by the triangulation unit.

In FIG. 3(a), there is no triangle having the outline segment 4-5 as its side, and triangles 2-5-6, 2-3-6, and 3-4-6 intersect the outline segment 4-5. Then, these triangles which intersect the outline segment 4-5 are deleted. When the group of points (points 2, 3 and 6) are classified into areas that are divided by the outline segment 4-5, points 2 and 3 are included in one area (left side area of the segment 4-5) while point 6 is included in the other area (right side area of the segment 6). Therefore, the triangulation is again performed using the points 2, 3, 4 and 5. The state after this processing is shown in FIG. 3(b). On the other hand, with respect to the points 4, 5 and 6, one triangle is uniquely decided, and accordingly another triangulation is not required.

After the processing for one outline segment is completed as described above, the operation proceeds to the next outline segment in step S190. Then, it is checked in step S130 whether or not the aforementioned processings have been carried out for all outline segments, thereby leading to finishing processings by the triangulation unit 104.

After the 2D convex closure containing the character is divided into plural triangles by the above-mentioned triangulation unit 104, the graphic component judgement unit 105 proceeds judgement as to whether each of the respective divided triangles is a component of the 2D character or not.

Figure 4:
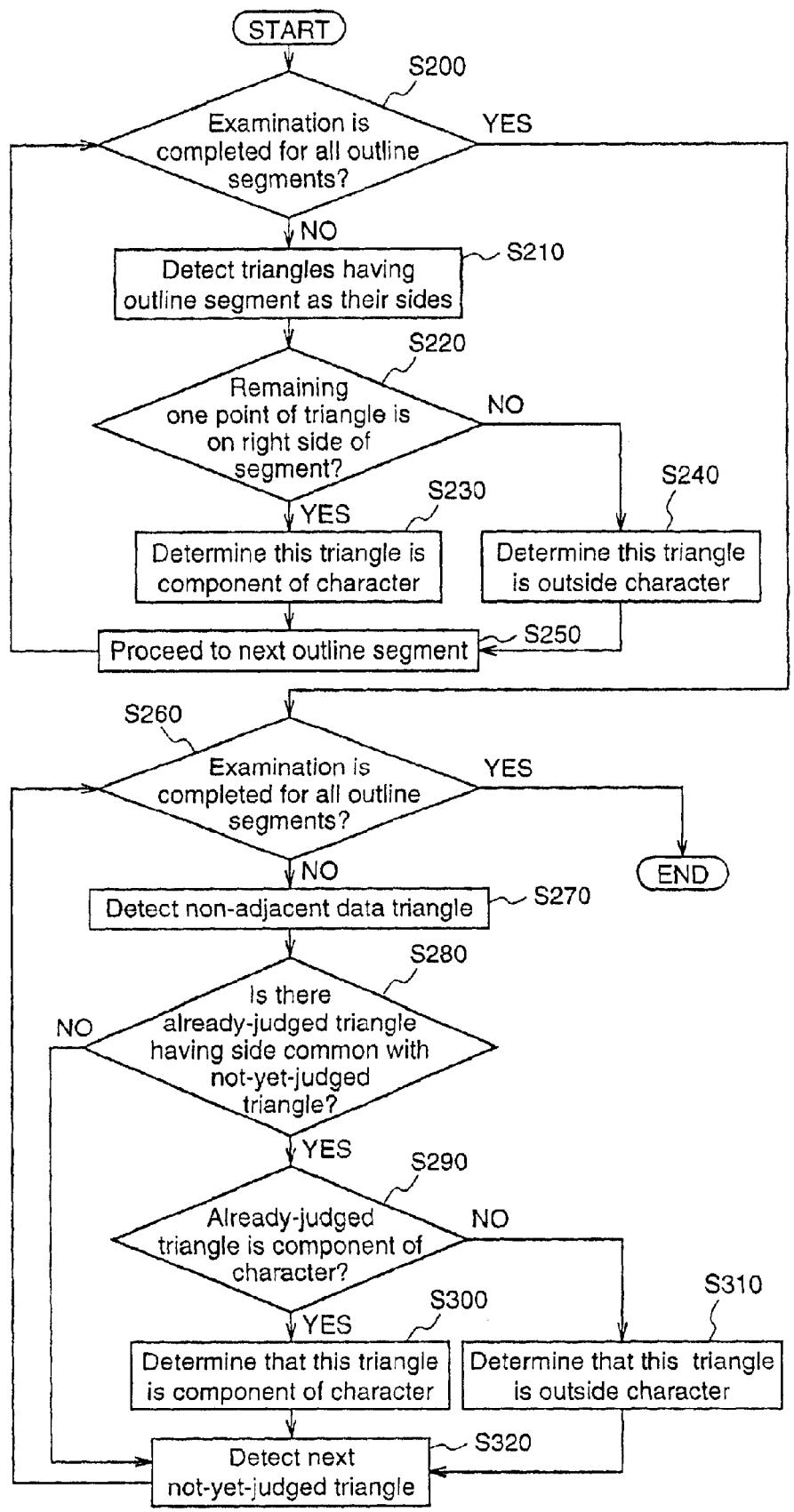
FIG. 4 is a flowchart showing a series of operations of a graphic component judgement unit according to the first embodiment.

Hereinafter, with reference to FIG. 4, the graphic component judgement unit 105 will be described in detail. FIG. 4 is a flowchart showing a series of processings in the graphic component judgement unit according to the first embodiment.

Initially in step S210, triangles having an outline segment as their sides are detected. From the above-mentioned processing in the triangulation unit 104, there are one or two triangles (adjacent data triangles) which have the outline segment as their sides. Next, in step S220, which side with respect to the outline advancing direction includes one of the vertices of the triangles detected in step S210, which vertex is not on the outline segment, is judged. Here, it is assumed that the outline advancing direction refers to a direction in which the sequence of points are traced according to the order that is defined by the outline data obtaining unit 103. For example, in FIG. 3, the outline advancing direction is a direction directing from the vertex of smaller number to the vertex of a larger number. Then, the judgement as to whether the triangles detected in step S210 are components of the character or not is made under the following procedure.

Initially, it is assumed that two points on an outline segment among three vertices of a triangle is Pi=(xPi, yPi) and P(i+1)=(xP(i+1), yP(i+1)), and a remaining one point which is not on the outline segment Pi–P(i+1) is Vj=(xVj, yVj). Here, i=0, ..., N−1, and PN=P0. Further, for each triangle, an identifier for specifying the result of judgement as to whether this triangle is a component of the character or not is defined. (Here, when this triangle is a character component, the identifier is "1", and when this is not a character component, the identifier is "0".) Then, d=xPi×yPi+1+yPi×xVj+xP(i+1)×yVj−yPi+1×xVj−yPi×xP(i+1)−yVj×xPi is calculated, and on the basis of the value of d, whether the triangle Pi–P(i+1)–Vj is a character component or not is judged.

To be more specific, when d has a negative value, Vj is on the right side of the outline segment Pi–P(i+1). Therefore, the triangle Pi–P(i+1)–Vj is determined to be a component of the character, and an identifier "1" is added (step S230). On the contrary, when d has a positive value, Vj is on the left side of the outline segment Pi–P(i+1). Therefore, the triangle Pi-P(i+1)–Vj is determined not to be a component of the character, and an identifier "0" is added (step S240).

Here, in a case where the outline data of the character are arranged in reverse order to that in the above-mentioned case, when d has a positive value and the triangle is judged to be a component of the character, an identifier "1" is added, while when d has a negative value and the triangle is judged not to be a component of the character, an identifier "0" is added.

The processings for an outline segment as described above are repeated through the operation of proceeding to the next outline segment in step S250 until it is judged in step S200 that the examinations are completed for all outline segments. However, even when it is judged in step S200 that the examinations are completed, there may be some triangles (hereinafter, referred to as non-adjacent data triangles) which do not have any of the outline segments as their sides, among the triangles which are generated by the triangulation unit 104. In the example shown in figure 3(b), triangles 4-7-13 and 1-14-5 correspond to such triangles.

Therefore, these non-adjacent data triangles which have no outline segment as their sides are detected instep S270.

In order to detect these non-adjacent data triangles, because these non-adjacent data triangles are triangles for which whether or not it constitutes a character is not judged (hereinafter, referred to as "not-yet-judged triangles)", a method is conceivable in which at a time when the aforementioned processing of the triangulation unit 104 is completed, an identifier "−1" is added to all obtained triangles, and triangles having the identifier "−1" are detected at the time of step S270. Then in step S280, among adjacent data triangles for which whether they are the components of the character or not has already been judged in step S220 (hereinafter, referred to as "already-judged triangles"), which also co-have sides with the not-yet-judged triangles that are detected in step S270 are detected. The already-judged triangles as such are not required to be detected in plural but it is only necessary that a triangle be detected for each not-yet-judged triangle. Then, when no already-judged triangle having a side common with the not-yet-judged triangle that is detected in step S270 is detected in step S280, the processing for the not-yet-judged triangle is put on hold. Then, the operation proceeds to step S320 to detect the next not-yet-judged triangle. On the other hand, when an already-judged triangle having a side common with the not-yet-judged triangle is detected in step S280, the operation proceeds to step S290. Then, on the basis of the result of judgement as to whether the detected already-judged triangle is a component constituting the character or not, it is judged whether the not-yet-judged triangle is a component constituting the character or not. When it is determined in step S290 that the already-judged triangle is a component of the character, it is determined in step S300 that a not-yet-judged triangle having a side common with the already-judged triangle is also a component of the character, and an identifier "1" is added to the triangle. When it is determined in step S290 that the already-judged triangle is a component representing the outside of the character, it is determined in step S310 that a not-yet-judged triangle having a side common with the already-judged triangle is also a component constituting the outside of the character, and an identifier "0" is added to the triangle.

After the processing for an outline segment is completed, the next not-yet-judged triangle (non-adjacent data triangle) is detected in step S320, and the same processings as described above are carried out for all not-yet-judged triangles. When it is verified in step S260 that the judgement has been performed for all triangles, the processing of the graphic component judgement unit 105 is finished.

Then, after an identifier indicating whether or not each triangle is a component of the character is added to the triangle by the graphic component judgement unit 105, the graphic component 2D-to-3D transformation unit 106 spatially moves the coordinates of the vertices which form triangles to which an identifier "1" is added in accordance with a prescribed rule to generate a new plane, thereby to create a 3D character.

Figure 5:
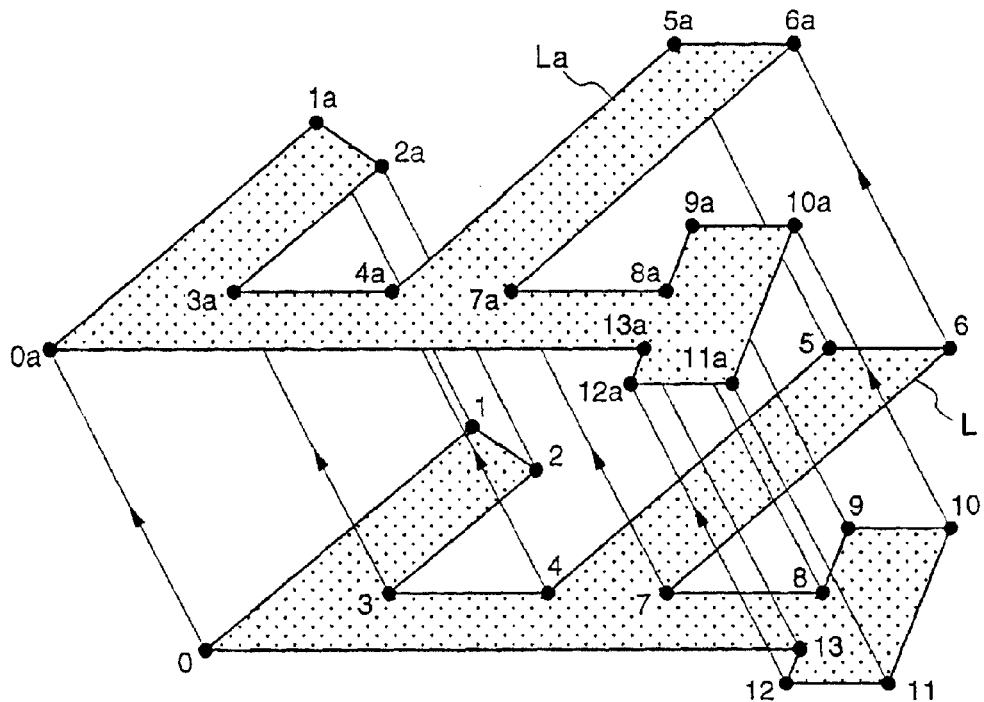
FIG. 5 is a diagram illustrating a state of a 2D character "山" which is processed by a graphic component 2D-to-3D transformation unit according to the first embodiment.

Hereinafter, the graphic component 2D-to-3D transformation unit 106 will be described in more detail with reference to FIG. 5. FIG. 5 is a diagram illustrating a state where a 3D character "山" is created by the graphic component 2D-to-3D transformation unit according to the first embodiment.

In FIG. 5, assuming a motion vector mv=(mvx, mvy, mvz), a vertex forming a 2D character L, i.e., Pi=(pix, piy) is moved to Pia=(pi(x+mvx), pi(y+mvy), pi(mvz)). Here, i=0, . . . , N−1.

By moving all of these vertices, a new plane La is created. Then, the points Pi and Pia are connected with each other, thereby creating a 3D character. Therefore, as apparent from FIG. 5, respective side surfaces of the 3D character comprise quadrilaterals, respectively.

From the above-mentioned processings, the creation of the 3D character is completed.

According to this first embodiment, the 2D graphic information 101 and the font type information 102 are inputted to the outline data obtaining unit 103 of the 3D graphic generation apparatus 100, and outline data of the character are obtained from the outline data storage device 107 on the basis of the information. Then, the triangulation unit 104 triangulates a plane which is a 2D convex closure containing the character, on the basis of the obtained outline data. Then, the graphic component judgement unit 105 judges whether each of the obtained triangles is a component of the character, and the graphic component 2D-to-3D transformation unit 106 spatially moves vertices of triangles which are judged as components of the character, thereby creating a 3D character from the 2D character. Therefore, transforming a 2D graphic including a character or the like into a 3D graphic does not require a manual operation by the operator, but a 3D character can be automatically created by a simple operation, without heavy burdens being imposed on the operator, easing the creation of 3D graphics.

Further, according to the first embodiment, outline data is added to the 2D graphic, and on the basis of the outline data, the 2D graphic is divided into triangles by the triangulation unit 104 using the method according to the Delaunay triangulation. Therefore, the 2D graphic is not divided by the triangulation unit 104 into triangles having extremely acute angles, whereby the obtained triangles can be easily processed in the following image processing and well-balanced 3D graphics can be created.

[Embodiment 2]

Hereinafter, a second embodiment of the present invention will be described with reference to FIGS. 6 to 8. According to the second embodiment, the quality of a 3D graphic including a created 3D character is improved.

Initially, with reference to FIG. 6, a structure of a 3D graphic generation apparatus 100a according to the second embodiment will be described. FIG. 6 is a diagram illustrating a structure of the 3D graphic generation apparatus of the second embodiment.

Figure 6:
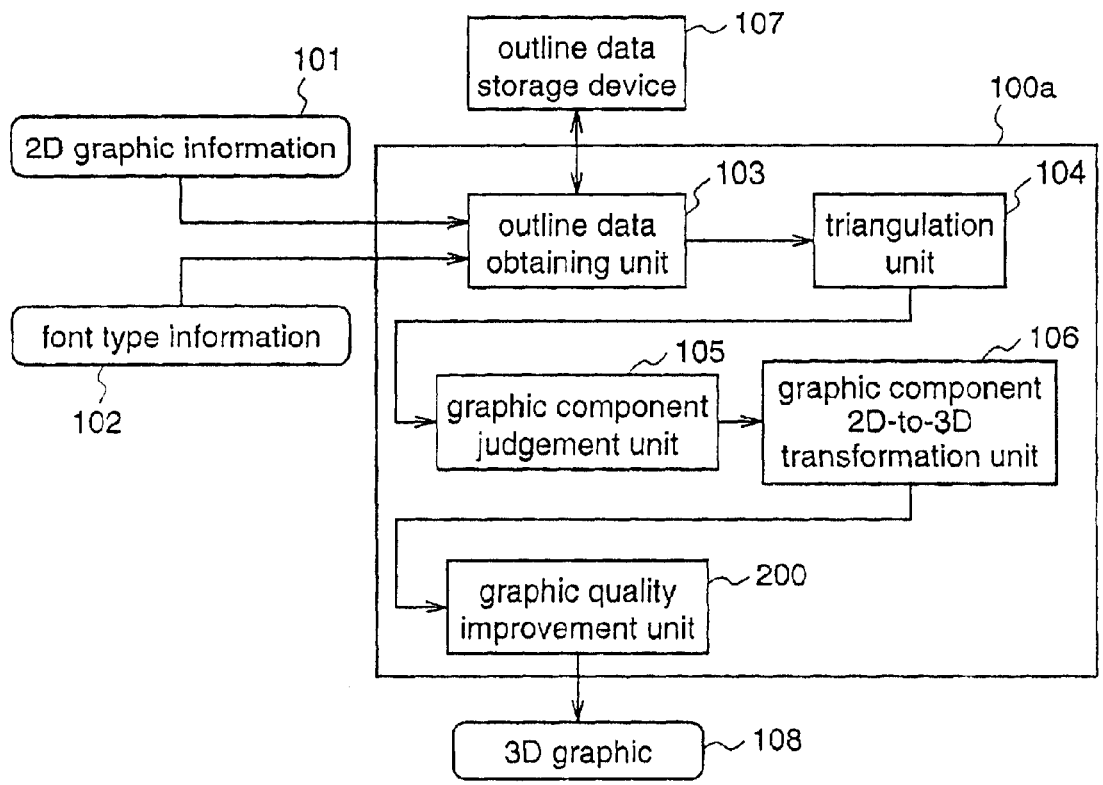
FIG. 6 is a block diagram illustrating a structure of a 3D graphic generation apparatus according to a second embodiment of the present invention.

In FIG. 6, the 3D graphic generation apparatus 100a according to the second embodiment further includes a graphic quality improvement unit 200 for improving the quality of a 3D character created by the graphic component 2D-to-3D transformation unit 106. In FIG. 6, the same elements as those in FIG. 1 are given the same reference numerals, and are not described here.

While there are various approaches for improving the character quality, the 3D graphic generation apparatus 100a of the second embodiment transforms the surface into a smoother curved surface, thereby improving the quality of the character. The creation of the smoother curved surface is realized by representing the shape of the character by a cluster of many polygons (subdivision of polygon), and further adjusting the coordinates of the vertices which form the polygons so that the shape of the character has a smooth and curved surface.

As a technique of generating such a smooth curved surface, there is a subdivision surface technique, which theoretically ensures that the division of a polygon by an infinite number of times will converge to a limit of a curved surface. This subdivision surface technique is classified into various methods, like Loop subdivision surface, Catmull-Clark subdivision surface, and the like, according to differences in the rule for dividing a polyhedron or differences in the rule for adjusting the coordinates of vertices after the division.

For example, FIGS. 7(a) and 7(b) show a pentagonal pillar to which one step of Catmull-Clark subdivision is applied.

FIG. 7(a) is a diagram illustrating a pentagonal pillar before performing the Catmull-Clark subdivision. FIG. 7(b) is a diagram illustrating the pentagonal pillar that has been subjected to one step of the Catmull-Clark subdivision.

Figure 7:
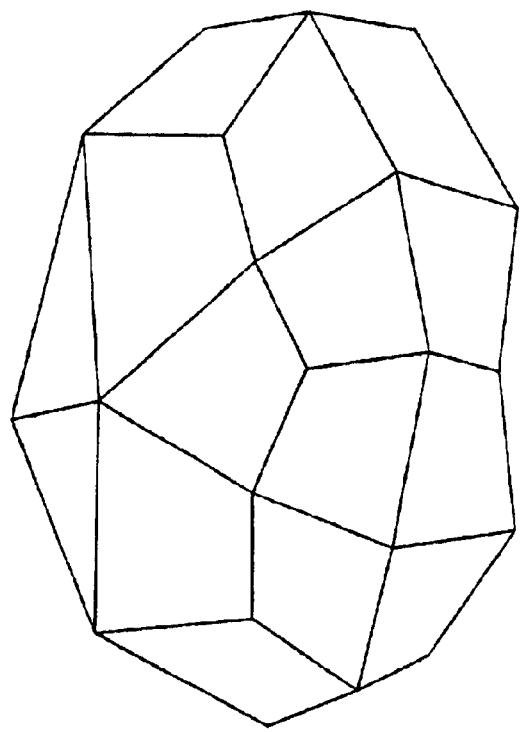
FIGS. 7(a) and 7(b) are diagrams illustrating a pentagonal pillar that is subjected to a Catmull-Clark subdivision process according to the second embodiment.
Figure 7:
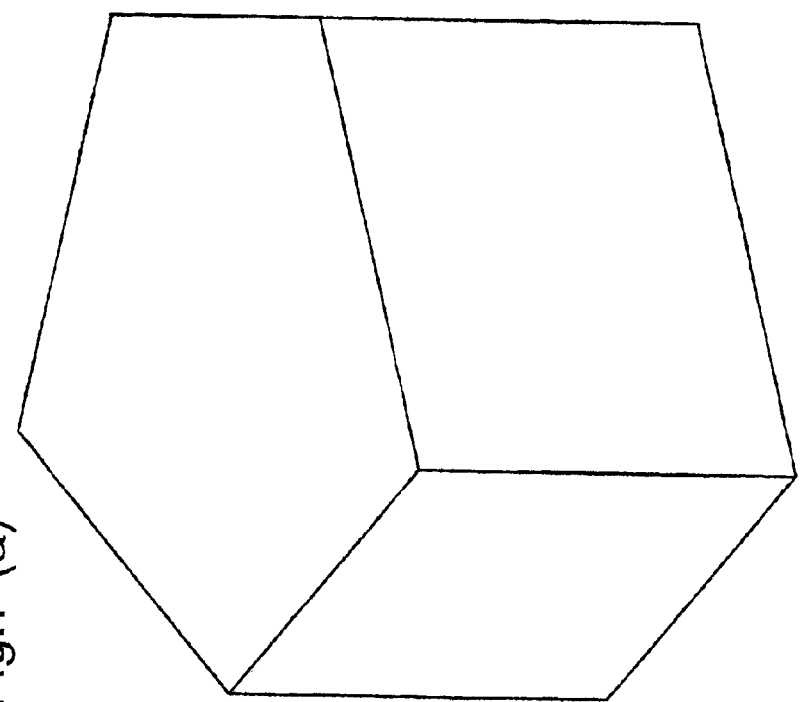
Figure 8:
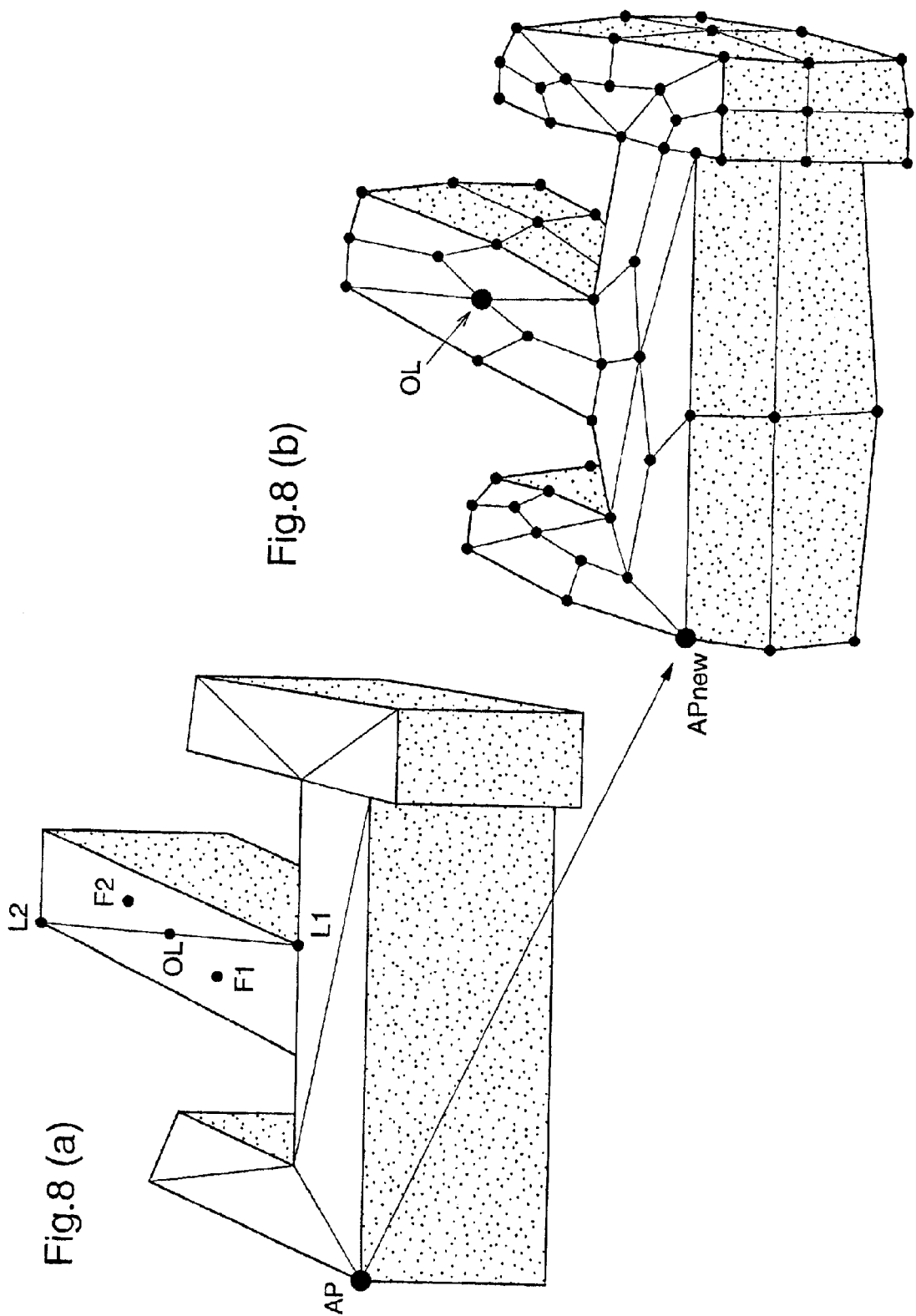
FIGS. 8(a) and 8(b) are diagrams illustrating states of a 3D character "山" that is processed by a graphic quality improvement unit according to the second embodiment.

As apparent from FIGS. 7, by utilizing the subdivision surface technique, the edges of the pentagonal pillar are rounded and the shape comes near a smooth curved surface. In the graphic quality improvement unit 200 of the second embodiment, the character quality is improved by using the above-mentioned subdivision surface technique, while its algorithm is not particularly limited.

Hereinafter, with reference to FIGS. 8(a) and 8(b), a description will be given of an operation process in a case where the quality of a 3D character "山" that is generated by the graphic component 2D-to-3D transformation unit 106 is improved by the graphic quality improvement unit 200 with using, for example, the Catmull-Clark subdivision.

FIGS. 8(a) and 8(b) are diagrams illustrating states before and after the graphic quality improvement unit according to the second embodiment applies the Catmull-Clark subdivision to the 3D character "山". FIG. 8(a) shows a 3D character "山" before being subjected to the Catmull-Clark subdivision. FIG. 8(b) shows the 3D character "山" after being subjected to the Catmull-Clark subdivision.

Initially, point F is set at the center of the surface of each polygon which forms the shape of this character (hereinafter, this point is referred to as "on-surface point"). Next, point OL is set at the midpoint of each side of the polygons which form the shape of the character (hereinafter, this point is referred to as "on-side point"). Then, the on-surface point F and each on-side point OL is connected, thereby subdividing the polygon.

Further, in the Catmull-Clark subdivision, the coordinates of the points are adjusted in accordance with following rules.

(1) The on-surface point F is at the center of the surface.
(2) The coordinates of the on-side point OL=(xOL, yOL, zOL) is obtained using two points forming the side, L1=(xL1, yL1, zL1) and L2=(xL2, yL2, zL2), and two on-surface points F1=(xF1, yF1, zF1) and F2=(xF2, yF2, zF2).

xOL=(xL1+xL2+xF1+xF2)/4, yOL=(yL1+yL2+yF1+yF2)/4, zOL=(zL1+zL2+zF1+zF2)/4

(3) Assuming that not-yet-adjusted coordinates of a vertex AP of a polygon that has existed before the subdivision process, AP=(xAP, yAP, zAP), the number of vertices being connected with the vertex AP is n, the sum of coordinate values corresponding to the vertex AP and the vertices of the polygon which are connected with the vertex AP is (sumxV, sumyV, sumzV), and the sum of coordinate values corresponding to on-surface points that exist on surfaces around the vertex AP is (sumxF, sumyF, sumzF), the coordinates of a vertex APnew=(xAPnew, yAPnew, zAPnew) that is obtained by adjusting the vertex AP is: xAPnew=(n−2)/n×xAP+1/n²×sumxV+1/n²×sumxF, yAPnew=(n−2)/n×yAP+1/n²×sumyV+1/n²×sumyF, zAPnew=(n−2)/n×zAP+1/n²×sumzV+1/n²×sumzF.

The above-mentioned processings are repeated until a desired quality of the character is obtained.

According to this second embodiment, the 3D graphic generation apparatus 100a is provided with the graphic quality improvement unit 200, whereby the quality of the 3D graphic including a character or the like, generated by the graphic component 2D-to-3D transformation unit 106 can be improved. Further, the higher quality 3D graphic can be automatically created from a 2D graphic containing a character by a simple operation, without heavy burdens being imposed on the operator.

[Embodiment 3]

Hereinafter, a third embodiment of the present invention will be described with reference to FIGS. 9 and 10. According to this third embodiment, small asperities are added to the surfaces of the 3D character that is generated in the first embodiment, to decorate the 3D character.

Initially, with reference to FIG. 9, a structure of a 3D graphic generation apparatus 100b according to the third embodiment will be described. FIG. 9 is a diagram illustrating the structure of the 3D graphic generation apparatus according to the third embodiment.

Figure 9:
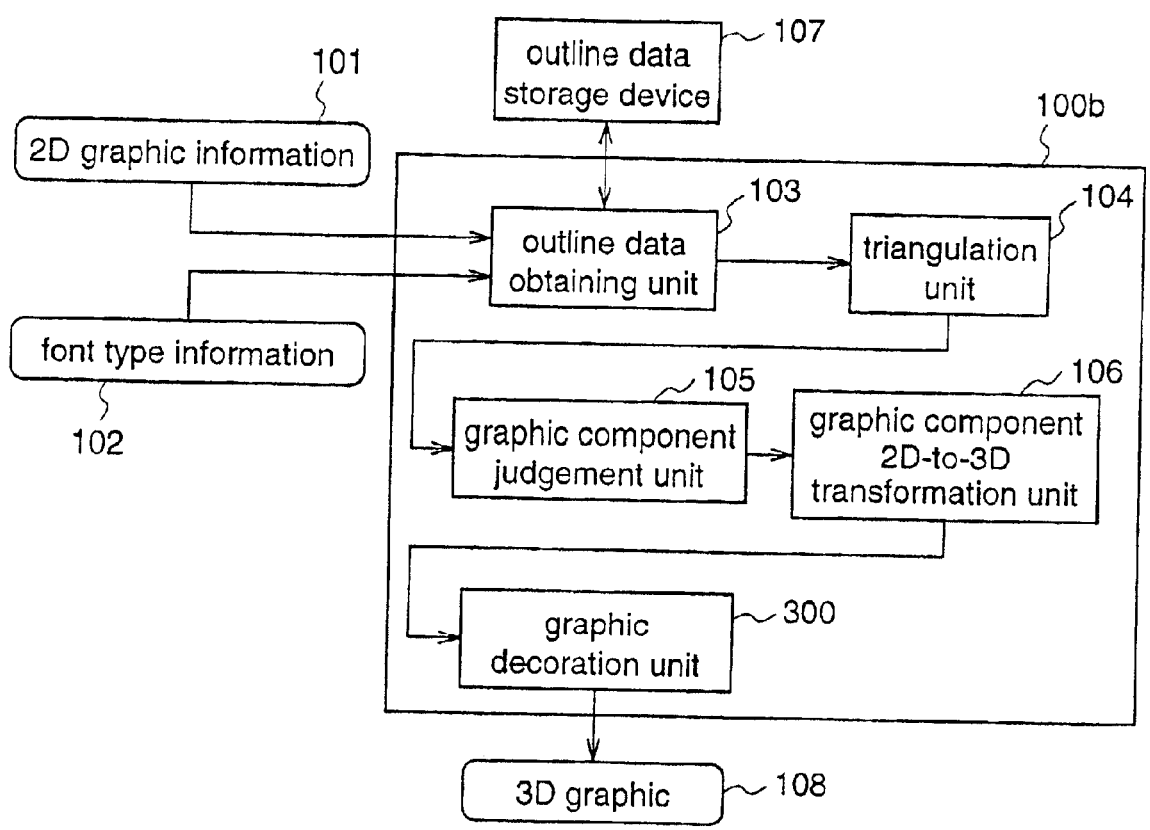
FIG. 9 is a block diagram illustrating a structure of a 3D graphic generation apparatus according to a third embodiment of the present invention.
Figure 10:
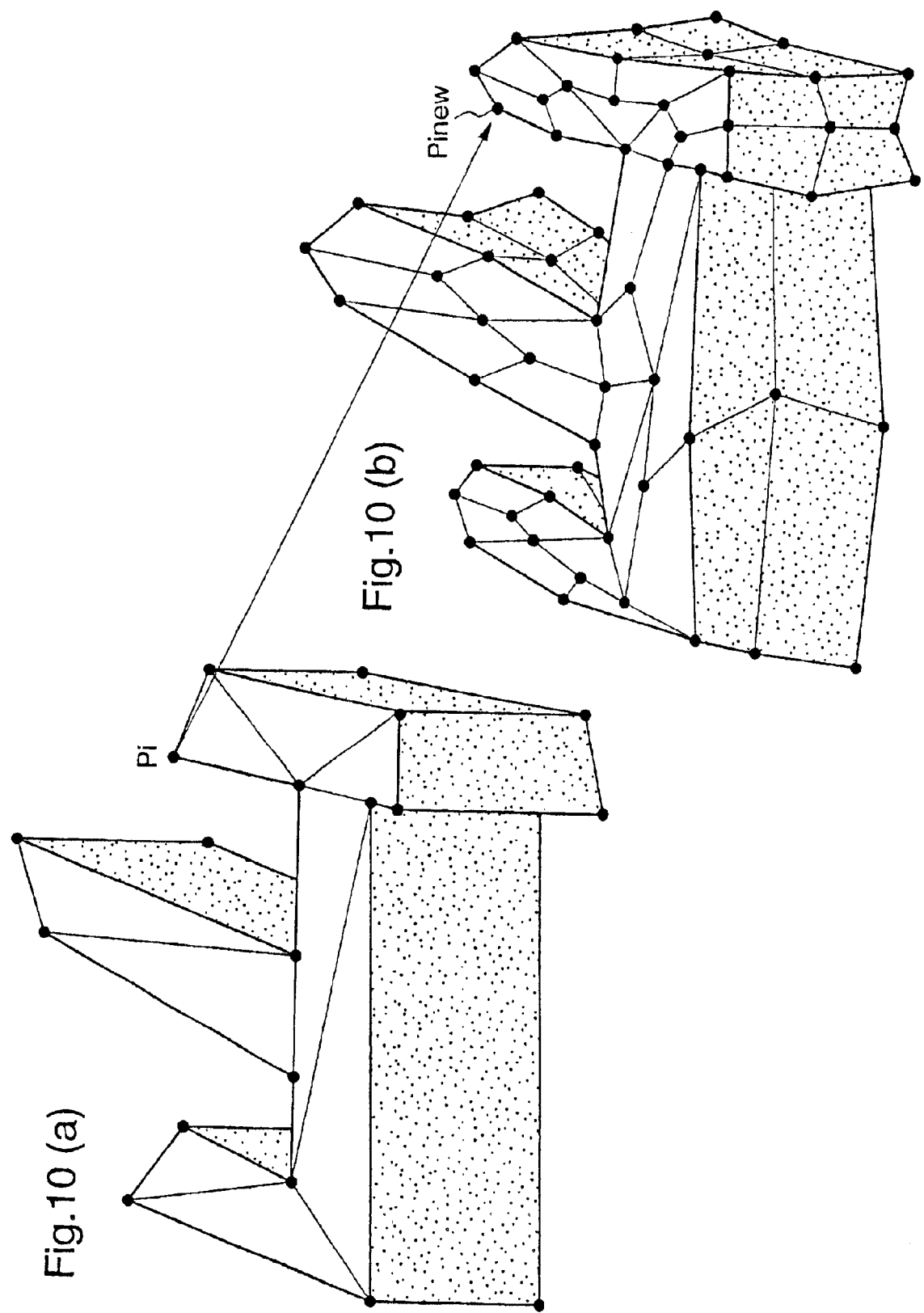
FIGS. 10(a) and 10(b) are diagrams illustrating states of a 3D character "山" that is processed by a graphic decoration unit according to the third embodiment.

In FIG. 9, the 3D graphic generation apparatus 100b of the third embodiment further includes a graphic decoration unit 300 for adding small asperities to the surfaces of the 3D character that is created by the graphic component 2D-to-3D transformation unit 106, to decorate the character. Accordingly, complicated asperities that would appear when the shape is generated, for example, by carving a stone or a rock can be easily added to the 3D character that is created by the graphic component 2D-to-3D transformation unit 106. In FIG. 9, the same element as those in FIG. 1 are given the same reference numerals.

Hereinafter, with reference to FIGS. 10(a) and 10(b), a description will be given of an operation process of the graphic decoration unit 300 for adding complicated asperities to a 3D character "山" that is created by the graphic component 2D-to-3D transformation unit 106, to decorate the character. FIGS. 10(a) and 10(b) are diagrams showing states of a 3D character "山" before and after a decoration process is performed in the graphic decoration unit according to the third embodiment. FIG. 10(a) shows a 3D character "山" before the decoration process. FIG. 10(b) shows the 3D character "山" that has already subjected to the decoration process.

Initially, as for a vertex Pi of a polygon constituting the 3D character, Pi=(xPi, yPi, zPi), a random integer (random [i]) is generated. Here, i=0, . . . , 2(N−1).

Then, the coordinates of the vertex Pi are changed into a point Pinew=(xPi, yPi, zPi+random[i]/random_max×α× zPi). Here, random_max is the absolute value of the maximum random number that can be generated, and α is a constant satisfying 0<α<1.

Further, with respect to the point Pinew, polygon subdivision is performed using the above-mentioned subdivision surface technique.

The above processings are repeated until a 3D character that is desirably decorated is obtained.

According to this third embodiment, the 3D graphic generation apparatus 100b is provided with the graphic decoration unit 300. Therefore, complicated asperities can be added to the 3D graphic including a character, which is generated by the graphic component 2D-to-3D transformation unit 106, to decorate the 3D character. Further, the 3D character can be automatically created from a 2D graphic including a character, through a simple operation, without heavy burdens imposed on the operator.

[Embodiment 4]

Figure 12:
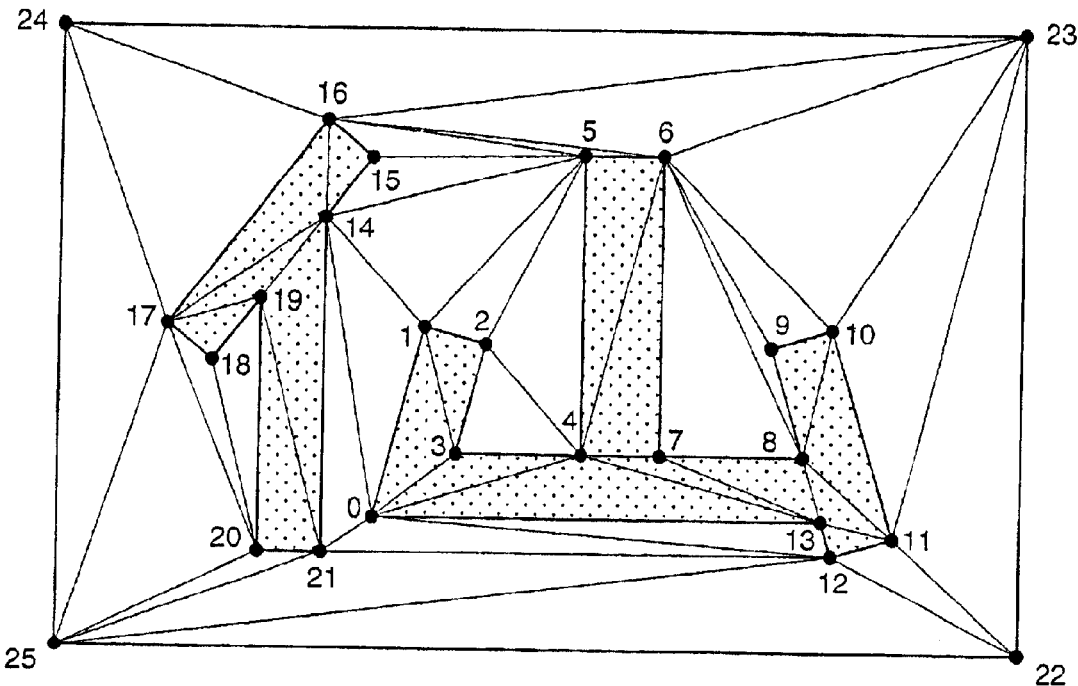
FIGS. 12(a) and 12(b) are diagrams illustrating states of a 2D character "山" that is processed by a triangulation unit 104 and a graphic component judgement unit 105, and a base plate containing this character according to the fourth embodiment.
Figure 12:
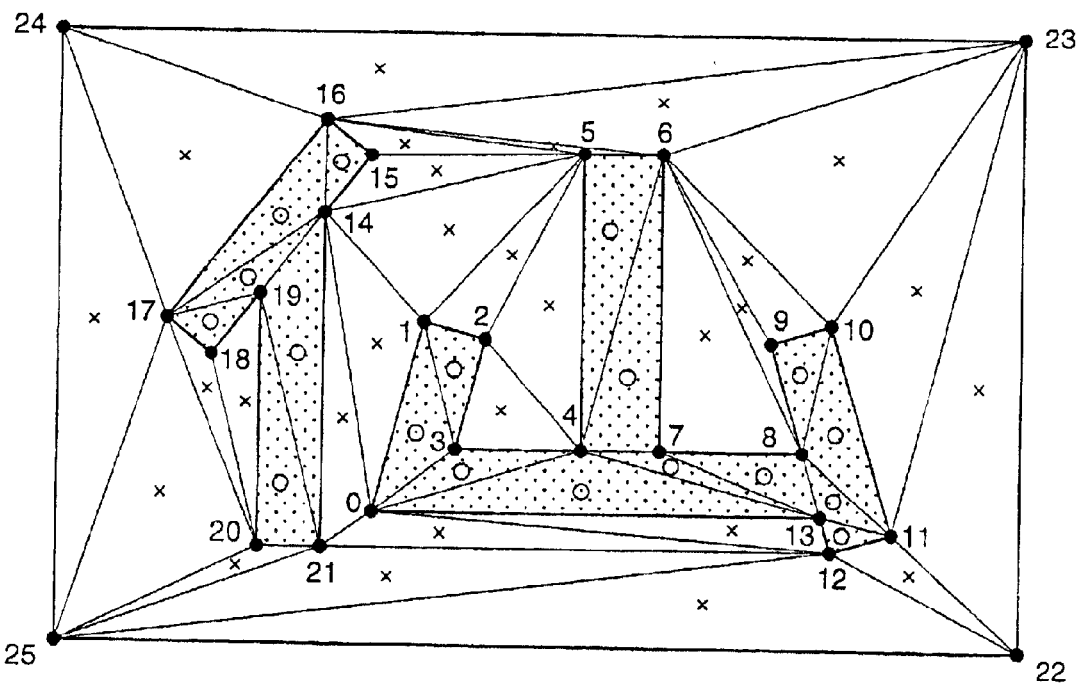
Figure 13:
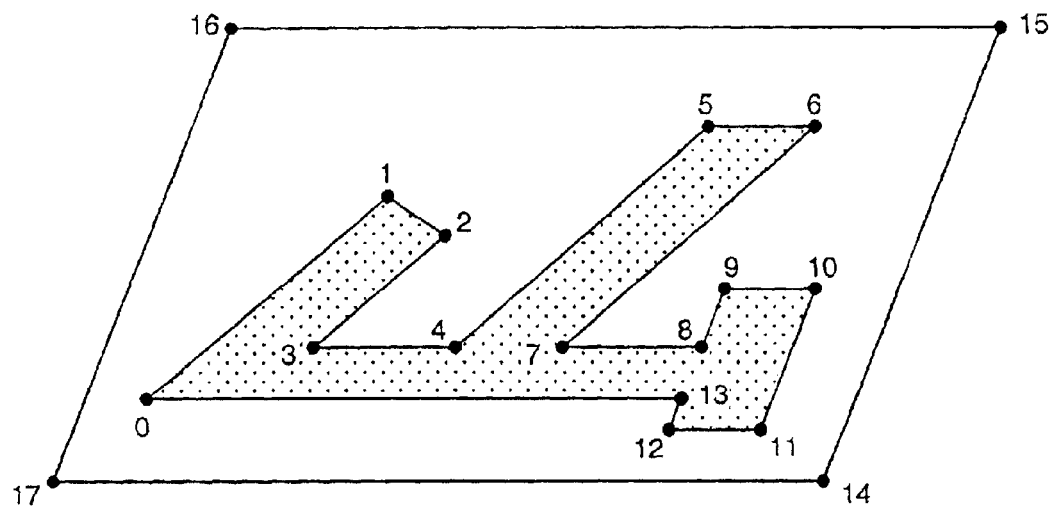
FIGS. 13(a) and 13(b) are diagrams illustrating a 3D character ("山") with base which is generated by a graphic and base-plate component 2D-to-3D transformation unit according to the fourth embodiment.
Figure 13:
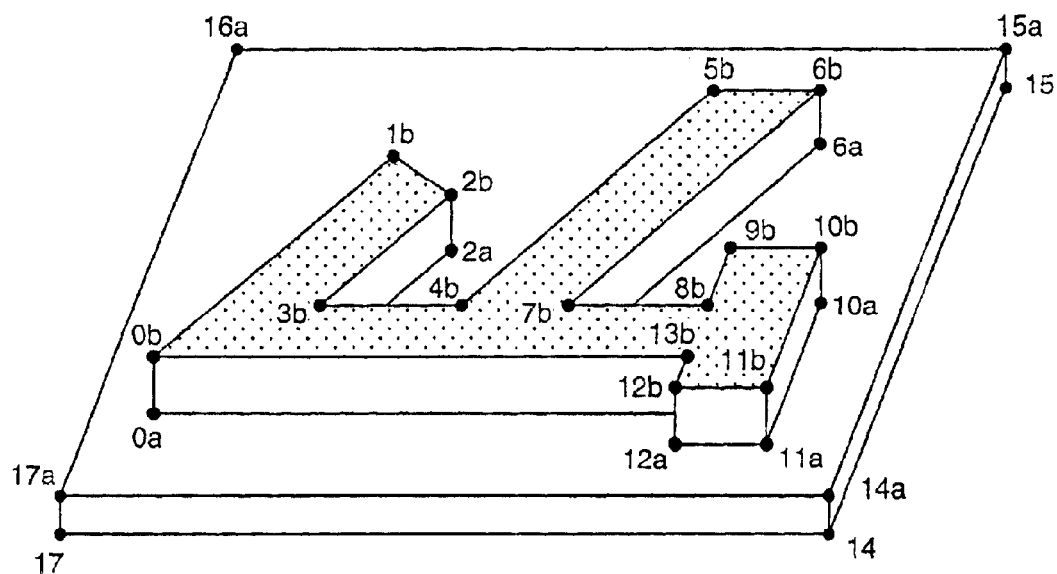

Hereinafter, a fourth embodiment of the present invention will be described with reference to FIGS. 11 to 13. According to this fourth embodiment, a 2D character has a base area of an arbitrary size that includes the character, and this 2D character is transformed into such a 3D image that the 2D character stands out from the base area.

Initially, a structure of a 3D graphic generation apparatus 100c according to the fourth embodiment will be described with reference to FIG. 11. FIG. 11 is a diagram illustrating the structure of the 3D graphic generation apparatus according to the fourth embodiment.

Figure 11:
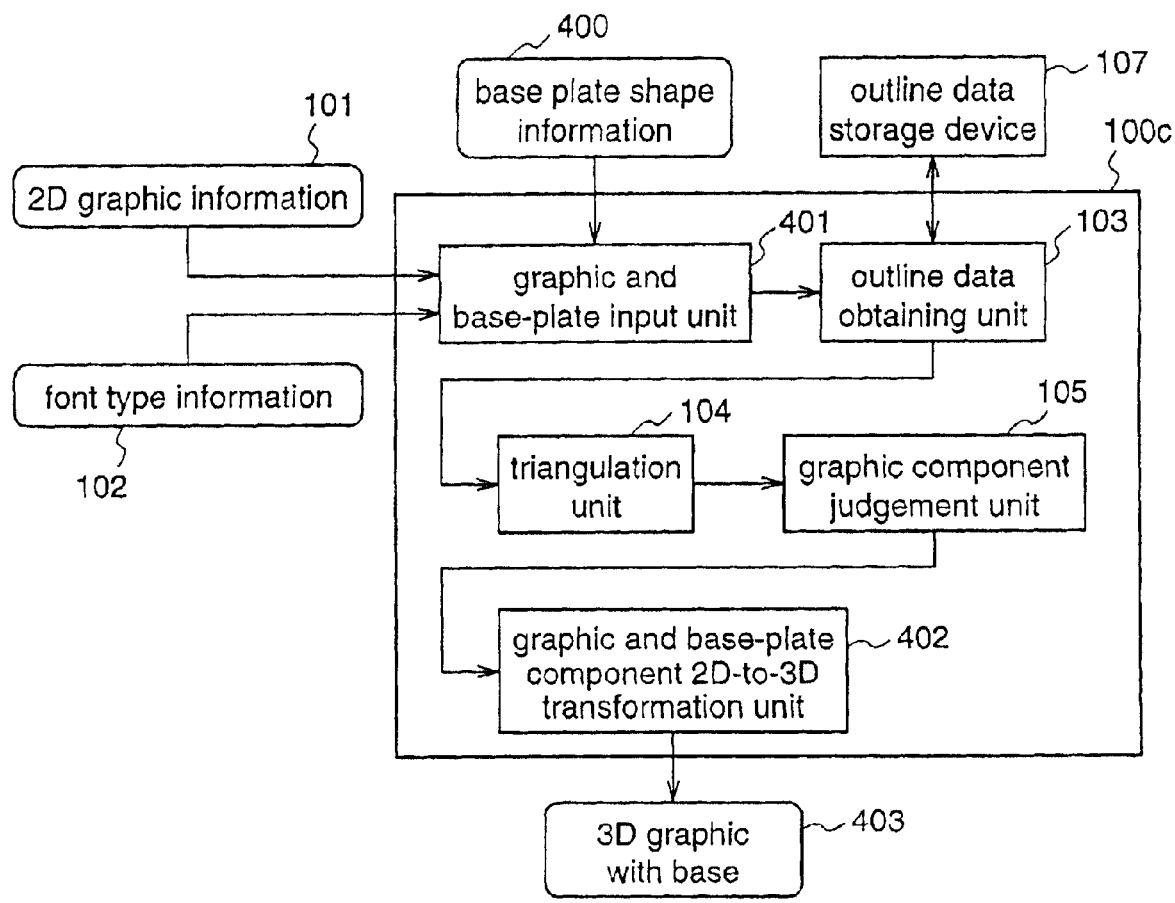
FIG. 11 is a block diagram illustrating a structure of a 3D graphic generation apparatus according to a fourth embodiment of the present invention.

In FIG. 11, the 3D graphic generation apparatus 100c of the fourth embodiment further includes a graphic and base-plate input unit 401, and a graphic and base-plate component 2D-to-3D transformation unit 402.

The graphic and base-plate input unit 401 obtains the 2D graphic information 101, the font type information 102, and the base plate shape information 400, and specifies the kind and the font of a character to be generated as well as a base-plate area of an arbitrary size that includes the character.

The base plate shape information 400 is information for specifying the base plate of an arbitrary size that includes the character. It is not particularly defined how to specify the base plate shape information 400. The users can manually input the coordinates of each vertex of the base plate. Or, a method may be employed in which a template for specifying only the shape is prepared, then the user selects one shape from the template, and thereafter the 3D graphic generation apparatus 100c automatically scales the selected shape of the template so that the shape contains the character. Here, the shape of the set base plate is assumed as a convex closure.

The 2D graphic information 101 and the font type information 102 are the same as those in the first embodiment. The method for specifying the type and the font of the character in the graphic and base-plate input unit 401 is the same as that in the first embodiment.

The graphic and base-plate component 2D-to-3D transformation unit 402 spatially moves parts which are judged by the graphic component judgement unit 105 as components of the character, to create a new plane for creating a 3D graphic with base 403 (a 3D character attached to a base). In FIG. 11, the same elements as those in FIG. 1 are given the same reference numerals.

Next, with reference to FIGS. 11 to 13, the operation of the 3D graphic generation apparatus 100c according to the fourth embodiment will be described.

Initially, the graphic and base-plate input unit 401 obtains the 2D graphic information 101, the font type information 102 and the base plate shape information 400, and specifies the type and the font of a character to be generated and a base-plate area of an arbitrary size that includes the character.

Next, the outline data obtaining unit 103 obtains outline data of the character corresponding to the inputted 2D graphic information 101 and font type information 102 from the outline data storage device 107, and also obtains outline data of the base plate corresponding to the base plate shape information 400. The outline data storage device 107 of the fourth embodiment contains outline data of the inputted character and outline data of the base plate. Here, assuming, as described in the first embodiment, that points of outline data are arranged in the clockwise direction when the outline data represent the periphery of the character, and points of outline data are arranged in the counterclockwise direction when the outline data represent the shape of a hole, points of outline data that represent the base plate should be arranged in the counterclockwise direction. When the points of the outline data that represent the periphery of the character are arranged in the counterclockwise direction, the points of the outline data that represents the base plate should be arranged in the clockwise direction. To be more specific, when the users manually input the outline data as the base plate shape information 400, the outline data are inputted so that the points will be arranged in the counter-clockwise direction. When the users select a previously prepared base plate template as the base plate shape information 400, respective templates are stored in the outline data storage device 107 so that outline data of the respective templates will be arranged in the counterclockwise direction. Further, an identifier indicating the shape of the hole is attached to the outline data of the base plate.

Then, the triangulation unit 104 represents an area constituted by the outline data of the 2D character and the base plate by a cluster of plural triangles. Then, the graphic component judgement unit 105 judges whether each of triangles existing in the area is a component of the character. On the basis of the obtained result, when the triangle is a component of the character, an identifier "1" is added, and when the triangle is a component constituting the outside of the character, an identifier "0" is added. Here, the triangulation unit 104 and the graphic component judgement unit 105 perform the operations in the same processing method as described in the first embodiment. To be more specific, FIG. 12(a) shows a result of the triangulation process for a 2D character "山" included in a base plate, and FIG. 12(b) shows a result of the process for judging whether each of the obtained triangles is a component of the character or not. FIG. 12(b) shows that triangles to which "o" is attached are components of the character, and triangles to which "x" is attached are components of areas outside the character.

Then, the graphic and base-plate component 2D-to-3D transformation unit 402 carries out a 2D-to-3D transformation process not only for the components of the character which have been judged by the graphic component judgement unit 105, but also for the components of the base plate.

Hereinafter, the graphic and base-plate component 2D-to-3D transformation unit 402 will be described in more detail with reference to FIG. 13. Here, as an example, a description will be given of a case where outline data is translated only in the z-axis direction to generate a 3D character. FIG. 13 are diagrams showing states of a 2D character "山" and a rectangular base plate containing this 2D character before and after being transformed into 3D graphics by the graphic and base-plate component 2D-to-3D transformation unit of the fourth embodiment. FIG. 13(a) shows the 2D graphic "山" and the base plate before subjected to the 2D-to-3D transformation process, and FIG. 13(b) shows a 3D character "山" which stands out against the base plate after subjected to the 2D-to-3D transformation process.

Initially, outline data of the 2D character Pi=(xPi, yPi) is moved to Pia=(xPi, yPi, h). Here, i=0, . . . , N−1, and h is a positive constant.

Next, outline data of the base plate containing the 2D character Ei=(xEi, yEi) is moved to Eia=(xEi, yEi, h). Here, i=0, . . . , M−1.

Then, Pia=(xPi, yPi, h) is further moved to Pib=(xPi, yPi, h+hc). Here, hc is a positive constant.

Then, Ei and Eia that are obtained as described above are connected to generate a shape corresponding to a side surface of the base plate, and Pia and Pib are connected to generate a shape corresponding to a side surface of the character.

By using the above-mentioned method, a 3D character that stands out from the top surface of a base plate is generated.

According to the fourth embodiment, the 3D graphic generation apparatus 100c is provided with the graphic and base-plate input unit 401 for specifying the 2D graphic information 101 as information concerning a 2D graphic including a character and the font type information 102, as well as the base plate shape information 400 as information concerning a base plate containing the 2D character; and the graphic and base-plate component 2D-to-3D transformation unit 402 for transforming the 2D graphic and the base plate into 3D images. Therefore, it is possible to generate a 3D graphic, for example, comprising the 3D graphic standing out from a 3D base plate from the 2D graphic and the base plate containing this 2D graphic at once while the base plate and the 2D graphic being composed with each other. Further, a 3D graphic with a base comprising a 3D base plate and a 3D graphic can be automatically created from the 2D graphic and the base plate containing this 2D graphic through a simple operation, without heavy burdens imposed on the operator.

The 3D graphic with base that has been created as described above can also be subjected to the quality improvement process as described in the second embodiment, or the decoration process as described in the third embodiment.

[Embodiment 5]

Hereinafter, a fifth embodiment of the present invention will be described with reference to FIGS. 14 and 15. According to this fifth embodiment, a 2D character has an area to be engraved of an arbitrary size containing the character, and this 2D character is transformed into a 3D image in such a manner that the 2D character is engraved on the engraving area.

Initially, a 3D graphic generation apparatus 100*d* according to the fifth embodiment will be described with reference to FIG. 14. FIG. 14 is a diagram illustrating a structure of the 3D graphic generation apparatus of the fifth embodiment.

Figure 14:
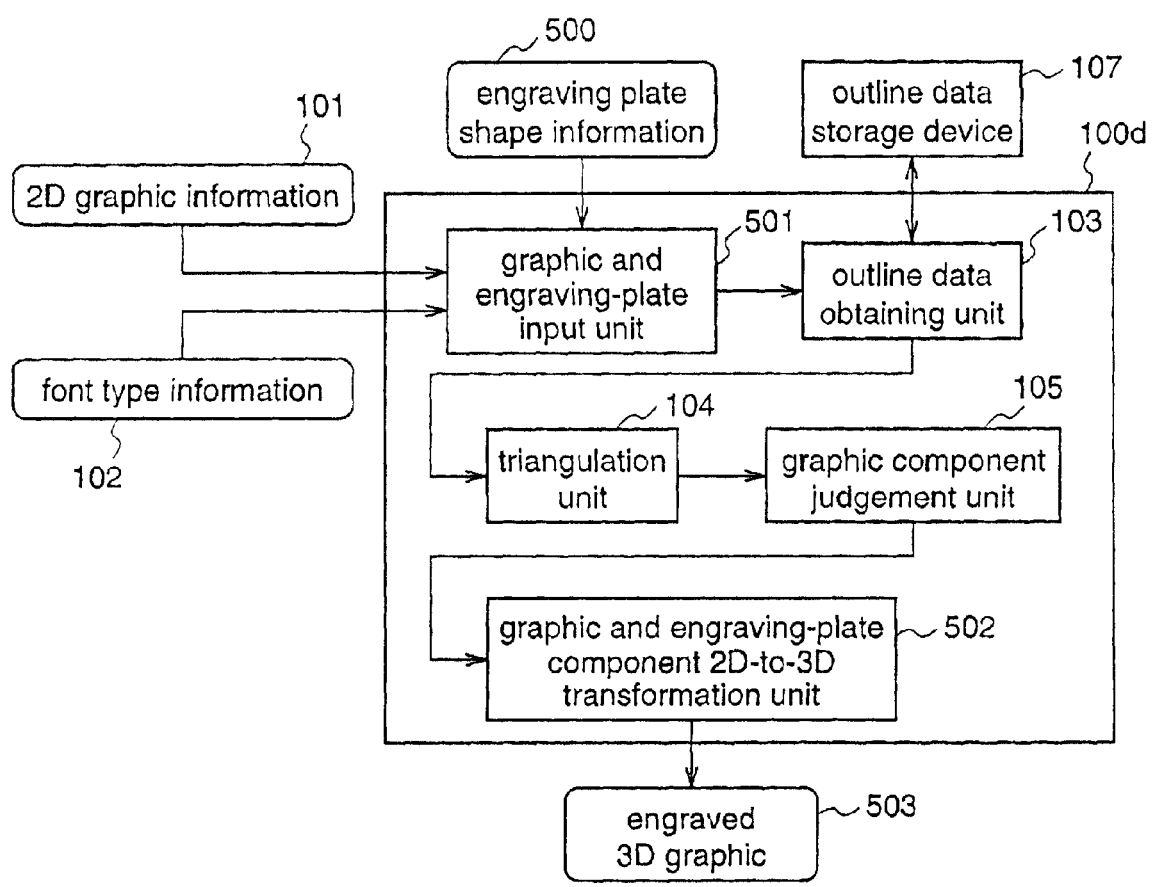
FIG. 14 is a block diagram illustrating a structure of a 3D graphic generation apparatus according to a fifth embodiment of the present invention.
Figure 15:
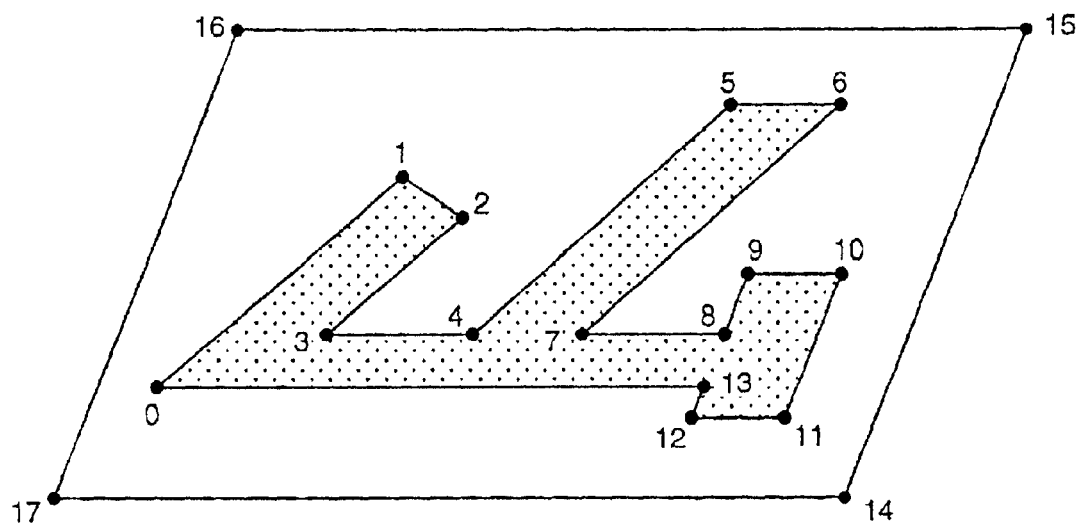
FIGS. 15(a) and 15(b) are diagrams illustrating an engraved 3D character "山" that is generated by a graphic and engraving-plate component 2D-to-3D transformation unit according to a fifth embodiment of the present invention.
Figure 15:
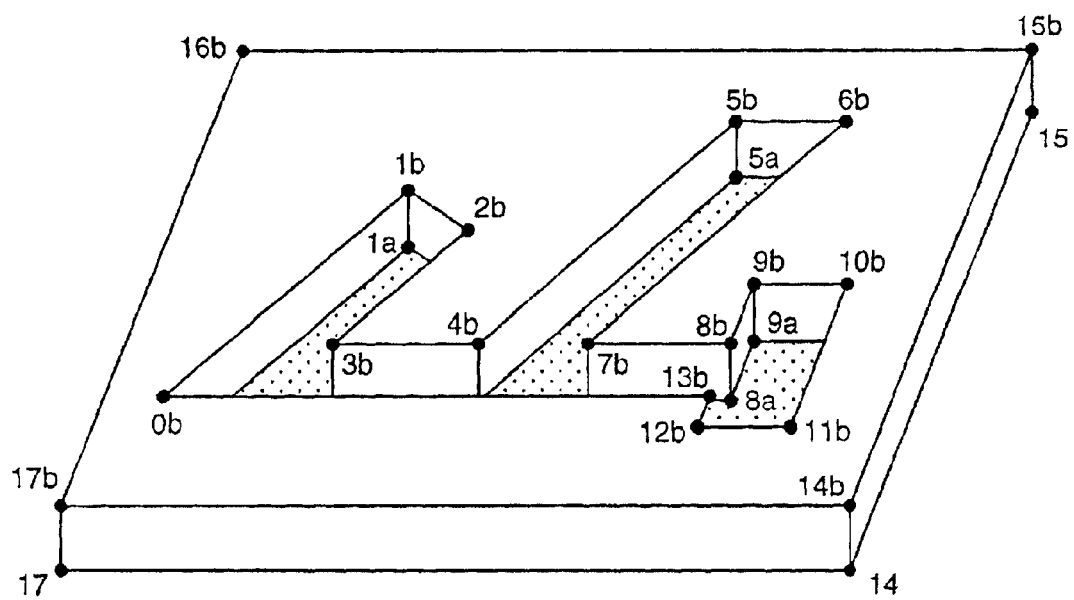

In FIG. 14, the 3D graphic generation apparatus 100*d* of the fifth embodiment further includes a graphic and engraving-plate input unit 501, and a graphic and engraving-plate component 2D-to-3D transformation unit 502.

The graphic and engraving-plate input unit 501 obtains the 2D graphic information 101, the font type information 102 and engraving plate shape information 500, and specifies the type and the font of a character to be generated and an engraving plate area of an arbitrary size that includes this character.

The engraving plate shape information 500 is information that specifies the engraving area of an arbitrary size containing the 2D character, and this information is obtained in the same way as the aforementioned base plate shape information 400.

The graphic and engraving-plate component 2D-to-3D transformation unit 502 spatially moves parts which have been judged by the graphic component judgement unit 105 as components constituting the character, thereby creating a new plane, to create an engraved 3D character 503. Here, in FIG. 14, the same reference numerals as those in FIG. 1 denote the same elements, and their descriptions are omitted here.

Next, the operation of the 3D graphic generation apparatus 100*d* according to the fifth embodiment will be described with reference to FIGS. 14 and 15.

Initially, the graphic and engraving-plate input unit 501 obtains the 2D graphic information 101, the font type information 102, and the engraving plate shape information 500, and specifies the type and the font of a character to be generated, and an engraving plate area of an arbitrary size containig the generated character.

Next, the outline data obtaining unit 103 obtains outline data of the character, corresponding to the inputted 2D graphic information 101 and font type information 102, from the outline data storage device 107, as well as obtains outline data of the engraving plate, corresponding to the engraving plate shape information 500. In the outline data storage device 107 according to the fifth embodiment, outline data of the inputted character and outline data of the engraving plate are stored. Assuming as described in the first embodiment that a sequence of points corresponding to outline data are arranged in the clockwise direction when the outline data represents the periphery of a character, and a point sequence corresponding to outline data are arranged in the counterclockwise direction when the outline data represents the shape of a hole, a point sequence of outline data representing the engraving plate should be arranged in the counterclockwise direction. On the other hand, when the points of outline data that represents the periphery of the character are arranged in the counterclockwise direction, the points of outline data that represents the engraving plate should be arranged in the clockwise direction. More specifically, when the user manually inputs the outline data as the engraving plate shape information 500, the points are inputted so as to be arranged in the counterclockwise direction. When the user selects a previously prepared template corresponding the engraving plate as the engraving plate shape information 500, respective templates are stored in the outline data storage device 107 so that outline data of the respective templates are arranged in the counterclockwise direction. Further, an identifier indicating the shape of the hole is assigned to the outline data of the engraving plate.

Then, the triangulation unit 104 represents areas constituted by the outline data of the 2D character and the engraving plate, with a cluster of plural triangles. Then, the graphic component judgement unit 105 judges whether each triangle existing in the areas is a component of the character, then on the basis of the obtained result, adds an identifier "1" when the triangle is a component of the character while adding an identifier "0" when the triangle is a component of an area outside the character. Here, the triangulation unit 104 and the graphic component judgment unit 105 perform the same processes as those described in the first embodiment.

Then, the graphic and engraving-plate component 2D-to-3D transformation unit 502 carries out a 2D-to-3D transformation process to components of the character, which have been judged by the graphic component judgement unit 105, as well as to components of the engraving plate.

Hereinafter, with reference to FIG. 15, the graphic and engraving-plate component 2D-to-3D transformation unit 502 will be described in more detail. Here, a description is given, as an example, of a case where outline data is translated only in the z-axis direction to generate a 3D character. FIG. 15 are diagrams illustrating states of 2D character "山" and a rectangular engraving plate including this character before and after being transformed into 3D images by the graphic and engraving-plate component 2D-to-3D transformation unit according to the fifth embodiment. FIG. 15(*a*) shows the 2D character "山" and the engraving plate before being subjected to a 2D-to-3D transformation process. FIG. 15(*b*) shows a 3D character "山" carved on the engraving plate that has been subjected to the 2D-to-3D transformation process.

Initially, the outline data of the 2D character Pi=(xPi, yPi) is moved to Pia=(xPi, yPi, h). Here, i=0, . . . , N−1, and h is a positive constant.

Next, the outline data of the engraving plate containing the 2D character, Ei=(xEi, yEi) is moved to Eia=(xEi, yEi, h). Here, i=0, . . . , M−1.

Then, the outline data of the 2D character Pia=(xPi, yPi, h) is further moved to Pib=(xPi, yPi, h+hc). Here, hc is a positive constant.

Further, the outline data of the engraving plate containing the 2D character, Eia=(xEi, yEi, h) is further moved to Eib=(xEi, yEi, h+hc).

Then, Ei and Eib which are obtained as described above are connected to generate the shape corresponding to the side surface of the engraving plate, and Pia and Pib are connected to generate the shape corresponding to the side surface of the character.

By using the above-mentioned method, a 3D character that is carved on an engraving plate is generated.

According to the fifth embodiment, the 3D graphic generation apparatus 100d is provided with the graphic and engraving-plate input unit 501 for specifying the 2D graphic information 101 as information of a 2D graphic containing a character and the font type information 102, and an engraving plate shape information 500 as information of an engraving plate including the 2D graphic, and the graphic and engraving-plate component 2D-to-3D transformation unit 502 for transforming the 2D graphic and the engraving plate into 3D images. Therefore, a 3D graphic, for example, in which the 3D graphic is carved on the 3D engraving plate that has been transformed into 3D images can be generated from the 2D graphic and the engraving plate containing this 2D graphic at a time while the engraving plate and the 2D graphic are kept composed. Further, an engraved 3D graphic comprising a 3D engraving plate and a 3D graphic can be automatically created from the 2D graphic and the engraving plate containing this 2D graphic by a simple operation, without heavy burdens imposed on the operator.

The engraved 3D graphic that have been created as described above can also be subjected to the quality improvement process that is described in the second embodiment, or the decoration process that is described in the third embodiment.

[Embodiment 6]

Hereinafter, a sixth embodiment of the present invention will be described with reference to FIG. 16. In the sixth embodiment, 3D-transformed characters are created on the basis of speech information that is inputted from outside.

Initially, with reference to FIG. 16, a 3D graphic generation apparatus 100e according to the sixth embodiment will be described. FIG. 16 is a diagram illustrating a structure of a 3D graphic generation apparatus according to the sixth embodiment.

Figure 16:
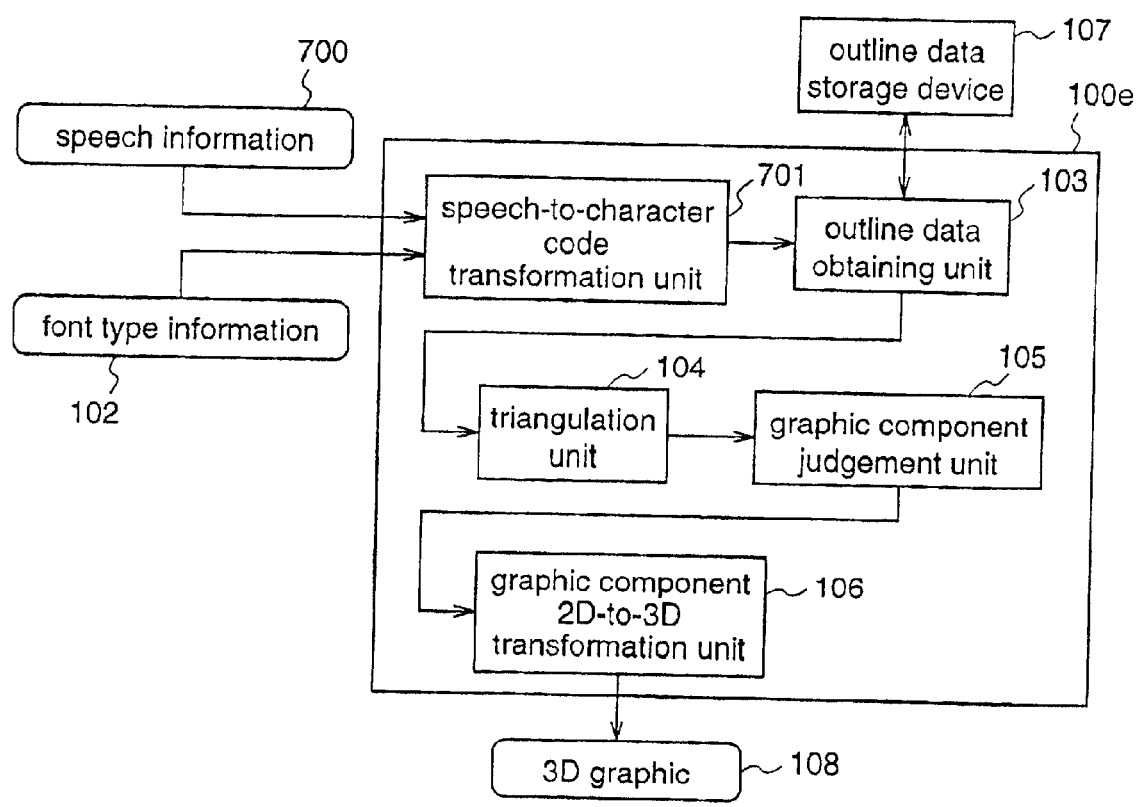
FIG. 16 is a block diagram showing a structure of a 3D graphic generation apparatus according to a sixth embodiment of the present invention.
Figure 17:
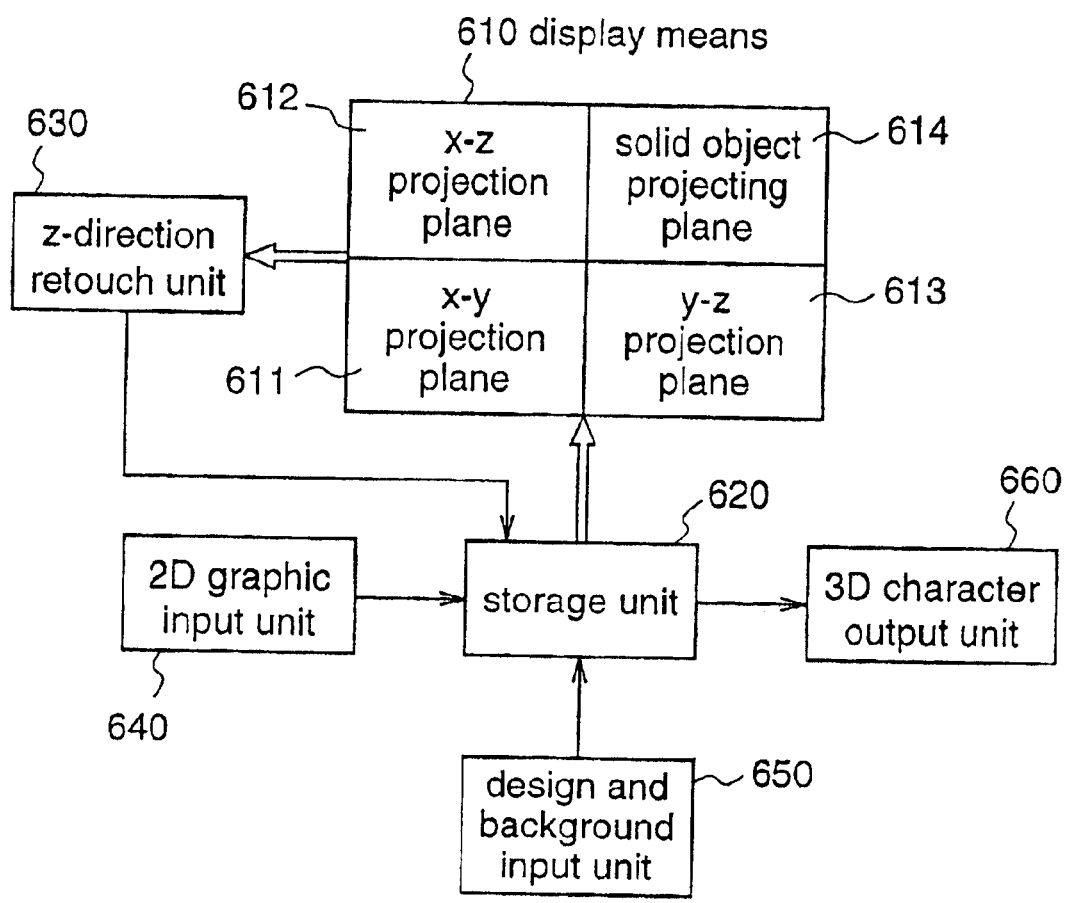
FIG. 17 is a block diagram showing a structure of a conventional 3D character generation apparatus.

In FIG. 16, the 3D graphic generation apparatus 100e according to the sixth embodiment is provided with a speech-to-character code transformation unit 701 for transforming speech information 700 that is announced by the operator into a character code. The speech information 700 is inputted to the 3D graphic generation apparatus 100e as data such as a frequency spectrum by utilizing a microphone or the like. In FIG. 16, the same elements as those in FIG. 1 are given the same reference numerals.

The operation of the 3D graphic generation apparatus 100e of the sixth embodiment will be described with reference to FIG. 16.

Initially, the speech-to-character code transformation unit 701 applies a speech recognition technique that is implemented by software or hardware, to inputted speech information 700, interprets which character is pronounced, and transforms a result that is obtained by the speech recognition technique into a character code.

Then, the outline data obtaining unit 103 obtains outline data of a 2D character, corresponding to both of the transformed character code and specified font type information 102, from the outline storage device 107.

Then, by using the outline data of the 2D character that is obtained as described above, a 3D character is generated by any of the methods according to the aforementioned first to fifth embodiments.

According to the sixth embodiment, the 3D graphic generation apparatus 100e is provided with the speech-to-character code transformation unit 701 for transforming the speech information 700 into a character code. Therefore, a 3D character can be automatically created from character information which is inputted as speech, by a simple operation.

What is claimed is:

1. A three-dimensional (3D) graphic generation apparatus including:

a triangulation unit for generating a two-dimensional (2D) convex closure that contains a 2D graphic and representing the 2D convex closure by a cluster of plural triangles by using outline data of the 2D graphic;

a graphic component judgement unit for judging whether each of the triangles generated by the triangulation unit is a component constituting the 2D graphic or not; and a graphic component 2D-to-3D transformation unit for generating side surfaces corresponding to outline data of a graphic formed by a cluster of triangles which have been judged by the graphic component judgement unit as constituting the 2D graphic, thereby generating a 3D graphic.

2. The 3D graphic generation apparatus of claim 1 wherein the triangulation unit includes:

a first division unit for dividing the 2D convex closure into plural triangles with using the outline data; and a second division unit for detecting triangles which intersect a segment that is obtained by connecting two adjacent points of the outline data, from the triangles obtained by the first division unit, to eliminate the detected triangles, and re-dividing an area corresponding to the eliminated triangles into triangles which do not intersect the segment.

3. The 3D graphic generation apparatus of claim 1 wherein the graphic component judgement unit includes:

an adjacent data triangle component judgement unit for, by using a segment that is obtained by connecting adjacent two points of the outline data, judging whether an adjacent data triangle that is a triangle having the segment as a side is a component of the 2D graphic or not; and a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not.

4. The 3D graphic generation apparatus of claim 1 including:

a graphic quality improvement unit for transforming the 3D graphic that is created by the graphic component 2D-to-3D transformation unit into a smooth and curved shape.

5. The 3D graphic generation apparatus of claim 1 including:

a graphic decoration unit for transforming the 3D graphic that is created by the graphic component 2D-to-3D transformation unit into a shape having small asperities.

6. The 3D graphic generation apparatus of claim 1 wherein
the 2D graphic is a 2D character, and a 3D character is created from the 2D character.

7. The 3D graphic generation apparatus of claim 6 including:
an outline storage device for holding 2D character outline data corresponding to 2D character codes and font type information; and
an outline data obtaining unit for obtaining 2D character outline data corresponding to the inputted 2D character code and font type information, from the outline storage device.

8. The 3D graphic generation apparatus of claim 6 including:
a speech-to-character code transformation unit for transforming speech into the 2D character code;
an outline storage device for holding 2D outline data corresponding to the 2D character code and font type information; and
an outline data obtaining unit for obtaining 2D character outline data corresponding to the 2D character code obtained by the speech-to-character code transformation unit, and the inputted font type information, from the outline storage device.

9. A 3D graphic generation apparatus including:
a triangulation unit for generating a 2D convex closure that contains a 2D graphic and a base plate and representing the 2D convex closure by a cluster of plural triangles, by using outline data of the 2D graphic and outline data of the base plate;
a graphic component judgement unit for judging whether each of the triangles generated by the triangulation unit is a component constituting the 2D graphic or not; and
a graphic and base plate component 2D-to-3D transformation unit for generating side surfaces corresponding to outline data of the base plate, and generating, from a top surface of the base plate, side surfaces corresponding to outline data of a graphic formed by a cluster of triangles which have been judged by the graphic component judgement unit as constituting the 2D graphic, thereby generating a 3D graphic with base.

10. The 3D graphic generation apparatus of claim 9 wherein
the triangulation unit includes:
a first division unit for dividing the 2D convex closure into plural triangles with using the outline data; and
a second division unit for detecting triangles which intersect a segment that is obtained by connecting adjacent two points of the outline data, from the triangles obtained by the first division unit, to eliminate the detected triangles, and re-dividing an area corresponding to the eliminated triangles into triangles which do not intersect the segment.

11. The 3D graphic generation apparatus of claim 9 wherein
the graphic component judgement unit includes:
an adjacent data triangle component judgement unit for, by using a segment that is obtained by connecting adjacent two points of the outline data, judging whether an adjacent data triangle that is a triangle having the segment as a side is a component of the 2D graphic or not; and
a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not.

12. The 3D graphic generation apparatus of claim 9 including:
a graphic quality improvement unit for transforming the 3D graphic with base which is created by the graphic and base plate component 2D-to-3D transformation unit into a smooth and curved shape.

13. The 3D graphic generation apparatus of claim 9 including:
a graphic decoration unit for transforming the 3D graphic with base which is created by the graphic and base plate component 2D-to-3D transformation unit into a shape having a small asperities.

14. The 3D graphic generation apparatus of claim 9 wherein
the 2D graphic is a 2D character, and a 3D character with base is created from the 2D character and the base plate.

15. A 3D graphic generation apparatus including:
a triangulation unit for generating a 2D convex closure that contains a 2D graphic and an engraving plate and representing the 2D convex closure by a cluster of plural triangles, by using outline data of the 2D graphic and outline data of the engraving plate;
a graphic component judgement unit for judging whether each of the triangles generated by the triangulation unit is a component constituting the 2D graphic or not; and
a graphic and engraving plate component 2D-to-3D transformation unit for generating side surfaces corresponding to outline data of the engraving plate, and generating, from a top surface of the engraving plate, side surfaces corresponding to outline data of a graphic formed by a cluster of triangles which have been judged by the graphic component judgement unit as not constituting the 2D graphic, thereby generating an engraved 3D graphic.

16. The 3D graphic generation apparatus of claim 15 wherein
the triangulation unit includes:
a first division unit for dividing the 2D convex closure into plural triangles with using the outline data; and
a second division unit for detecting triangles which intersect a segment that is obtained by connecting adjacent two points of the outline data, from the triangles obtained by the first division unit, to eliminate the detected triangles, and re-dividing an area corresponding to the eliminated triangles into triangles which do not intersect the segment.

17. The 3D graphic generation apparatus of claim 15 wherein
the graphic component judgement unit includes:
an adjacent data triangle component judgement unit for, by using a segment that is obtained by connecting adjacent two points of the outline data, judging whether an adjacent data triangle that is a triangle having the segment as a side is a component of the 2D graphic or not; and
a non-adjacent data triangle component judgement unit for, by using plural judgement results as to the adjacent data triangles performed by the adjacent data triangle component judgement unit, judging whether a non-adjacent data triangle that is a triangle which cannot be judged by the adjacent data triangle component judgement unit is a component of the 2D graphic or not.

18. The 3D graphic generation apparatus of claim 15 including:
a quality improvement unit for transforming the engraved 3D graphic that is created by the graphic and engraving plate component 2D-to-3D transformation unit, into a smooth and curved shape.

19. The 3D graphic generation apparatus of claim 15 including:
a graphic decoration unit for transforming the engraved 3D graphic that is created by the graphic and engraving plate component 2D-to-3D transformation unit, into a shape having small asperities.

20. The 3D graphic generation apparatus of claim 15 wherein
the 2D graphic is a 2D character, and an engraved 3D character is created from the 2D character and the engraving plate.

21. A 3D graphic generation method including:
a triangulation step of generating a 2D convex closure that contains a 2D graphic and representing the 2D convex closure by a cluster of plural triangles, by using outline data of the 2D graphic;
a graphic component judgement step of judging whether each of the triangles generated in the triangulation step is a component constituting the 2D graphic or not; and
a graphic component 2D-to-3D transformation step of generating side surfaces corresponding to outline data of a graphic formed by a cluster of triangles which have been judged in the graphic component judgement step as constituting the 2D graphic, thereby generating a 3D graphic.

22. The 3D graphic generation method of claim 21 wherein
in the triangulation step,
first triangulation is carried out for dividing the 2D convex closure into plural triangles, with using the outline data; and
second triangulation is carried out for detecting triangles which intersect a segment that is obtained by connecting adjacent two points of the outline data, from the obtained triangles, to eliminate the detected triangles, and re-dividing an area corresponding to the eliminated triangles into triangles which do not intersect the segment.

23. The 3D graphic generation method of claim 21 wherein
in the graphic component judgement step,
an adjacent data triangle having a segment that is obtained by connecting adjacent two points of the outline data as a side is detected;
a loop for judging which side of the segment includes one of points which forms the detected adjacent data triangle but is not located on the segment, thereby judging whether the adjacent data triangle is a component constituting the 2D graphic or not, is repeated for plural segments;
a non-adjacent data triangle which is constituted by non-adjacent three points of the outline data and has a side common with the adjacent data triangle that has been judged whether it is a component of the 2D graphic or not, is detected; and
a loop for judging whether the detected non-adjacent data triangle is a component of the 2D graphic or not, by using judgement results as to the adjacent data triangles is repeated for the plural non-adjacent data triangles.

24. The 3D graphic generation method of claim 21 wherein
the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character.

25. The 3D graphic generation method of claim 24 wherein
the outline data obtaining step includes a speech-to-character code transformation step of transforming speech information that is inputted from outside into the 2D character code.

26. A 3D graphic generation method including:
a triangulation step of generating a 2D convex closure that contains a 2D graphic and a base plate and representing the 2D convex closure by a cluster of plural triangles, by using outline data of the 2D graphic and outline data of the base plate;
a graphic component judgement step of judging whether each of the triangles generated in the triangulation step is a component constituting the 2D graphic or not; and
a graphic and base plate component 2D-to-3D transformation step of generating side surfaces corresponding to outline data of the base plate, and generating, from a top surface of the base plate, side surfaces corresponding to outline data of a graphic which is formed by a cluster of triangles which have been judged in the graphic component judgement step as constituting the 2D graphic, thereby generating a 3D graphic with base.

27. The 3D graphic generation method of claim 26 wherein
the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character.

28. A 3D graphic generation method including:
a triangulation step of generating a 2D convex closure that contains a 2D graphic and an engraving plate and representing the 2D convex closure by a cluster of plural triangles, by using outline data of the 2D graphic and outline data of the engraving plate;
a graphic component judgement step of judging whether each of the triangles generated in the triangulation step is a component constituting the 2D graphic or not; and
a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic.

29. The 3D graphic generation method of claim 28 wherein
the 2D graphic is a 2D character that is decided by a 2D character code and font type information; and an outline data obtaining step is carried out for obtaining 2D character outline data corresponding to an inputted 2D character code and font type information, from an outline storage device which holds outline data of the 2D character.

30. A program storage medium which contains a program for enabling a computer to implement a process for transforming a 2D graphic into a 3D graphic, said program being a 3D graphic generation program including:

a triangulation step of generating a 2D convex closure that contains the 2D graphic and representing the 2D convex closure by a cluster of plural triangles, by using outline data of the 2D graphic;

a graphic component judgement step of judging whether each of the triangles generated in the triangulation step is a component constituting the 2D graphic or not; and a graphic component 2D-to-3D transformation step of generating side surfaces corresponding to outline data of a graphic formed by a cluster of triangles which have been judged in the graphic component judgement step as constituting the 2D graphic, thereby generating a 3D graphic.

31. A program storage medium which contains a program for enabling a computer to implement a process for transforming a 2D graphic into a 3D graphic, said program being a 3D graphic-with-base generation program including:

a triangulation step of generating a 2D convex closure that contains a 2D graphic and a base plate and representing the 2D convex closure by a cluster of plural triangles, by using outline data of the 2D graphic and outline data of the base plate;

a graphic component judgement step of judging whether each of the triangles generated in the triangulation step is a component constituting the 2D graphic or not; and a graphic and base plate component 2D-to-3D transformation step for generating side surfaces corresponding to outline data of the base plate, and generating, from a top surface of the base plate, side surfaces corresponding to outline data of a graphic formed by a cluster of triangles which have been judged in the graphic component judgement step as constituting the 2D graphic, thereby generating a 3D graphic with base.

32. A program storage medium which contains a program for enabling a computer to implement a process for transforming a 2D graphic into an engraved 3D graphic, said program being an engraved 3D graphic generation program including:

a triangulation step of generating a 2D convex closure that contains a 2D graphic and an engraving plate and representing the 2D convex closure by a cluster of plural triangles, by using outline data of the 2D graphic and outline data of the engraving plate;

a graphic component judgement step of judging whether each of the triangles generated in the triangulation step is a component constituting the 2D graphic or not; and a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic.

33. A 3D graphic generation program for enabling a computer to implement a process for transforming a 2D graphic into a 3D graphic, said program including:

a triangulation step of generating a 2D convex closure that contains the 2D graphic and representing the 2D convex closure by a cluster of plural triangles, by using outline data of the 2D graphic;

a graphic component judgement step of judging whether each of the triangles generated in the triangulation step is a component constituting the 2D graphic or not; and a graphic component 2D-to-3D transformation step of generating side surfaces corresponding to outline data of a graphic formed by a cluster of triangles which have been judged in the graphic component judgement step as constituting the 2D graphic, thereby generating a 3D graphic.

34. A 3D graphic generation program for enabling a computer to implement a process for transforming a 2D graphic into a 3D graphic with base, said program including:

a triangulation step of generating a 2D convex closure that contains a 2D graphic and a base plate and representing the 2D convex closure by a cluster of plural triangles, by using outline data of the 2D graphic and outline data of the base plate;

a graphic component judgement step of judging whether each of the triangles generated in the triangulation step is a component constituting the 2D graphic or not; and a graphic and base plate component 2D-to-3D transformation step for generating side surfaces corresponding to outline data of the base plate, and generating, from a top surface of the base plate, side surfaces corresponding to outline data of a graphic formed by a cluster of triangles which have been judged in the graphic component judgement step as constituting the 2D graphic, thereby generating a 3D graphic with base.

35. A 3D graphic generation program for enabling a computer to implement a process for transforming a 2D graphic into an engraved 3D graphic, said program including:

a triangulation step of generating a 2D convex closure that contains a 2D graphic and an engraving plate and representing the 2D convex closure by a cluster of plural triangles, by using outline data of the 2D graphic and outline data of the engraving plate;

a graphic component judgement step of judging whether each of the triangles generated in the triangulation step is a component constituting the 2D graphic or not; and a graphic and engraving plate component 2D-to-3D transformation step of generating side surfaces corresponding to outline data of the engraving plate, and generating, from a top surface of the engraving plate, side surfaces corresponding to outline data of a graphic formed by a cluster of triangles which have been judged in the graphic component judgement step as not constituting the 2D graphic, thereby generating an engraved 3D graphic.

* * * * *